United States Patent [19]
Kakizaki et al.

[11] Patent Number: 6,070,567
[45] Date of Patent: Jun. 6, 2000

[54] INDIVIDUAL CYLINDER COMBUSTION STATE DETECTION FROM ENGINE CRANKSHAFT ACCELERATION

[75] Inventors: Shigeaki Kakizaki, Yokohama; Hirofumi Tsuchida, Kanagawa; Mikio Matsumoto, Yokohama, all of Japan

[73] Assignee: Nissan Motor Co., Ltd., Yokohama, Japan

[21] Appl. No.: 08/857,508

[22] Filed: May 16, 1997

[30] Foreign Application Priority Data

May 17, 1996 [JP] Japan ................................. 8-122099
Oct. 9, 1996 [JP] Japan ................................. 8-268251

[51] Int. Cl.$^7$ ................................. F02D 43/00; F02P 7/06
[52] U.S. Cl. ................................. 123/406.25; 73/116; 73/117.3; 123/436; 701/110
[58] Field of Search ................................. 123/419, 436, 123/406.24, 406.25; 73/116, 117.3; 701/110, 111

[56] References Cited

U.S. PATENT DOCUMENTS

| | | | |
|---|---|---|---|
| 3,972,230 | 8/1976 | Hanson et al. | 73/116 |
| 4,064,747 | 12/1977 | Rackliffe et al. | 701/102 X |
| 4,295,363 | 10/1981 | Buck et al. | 73/117.3 |
| 4,532,592 | 7/1985 | Citron et al. | 701/105 |
| 4,691,288 | 9/1987 | Kay et al. | 364/511 |
| 4,697,561 | 10/1987 | Citron | 123/339.14 |
| 4,932,379 | 6/1990 | Tang et al. | 123/436 |
| 4,936,277 | 6/1990 | Deutsch et al. | 123/436 |
| 5,016,591 | 5/1991 | Nanyoshi et al. | 123/419 |
| 5,044,194 | 9/1991 | James et al. | 73/112 |
| 5,044,195 | 9/1991 | James et al. | 73/117.3 |
| 5,056,360 | 10/1991 | Dosdall et al. | 73/116 |
| 5,076,098 | 12/1991 | Miwa | 73/115 |
| 5,088,318 | 2/1992 | Osawa | 73/117.3 |
| 5,095,742 | 3/1992 | James et al. | 73/116 |
| 5,105,657 | 4/1992 | Nakaniwa | 73/117.3 |
| 5,109,695 | 5/1992 | James et al. | 73/117.3 |
| 5,331,848 | 7/1994 | Nakagawa et al. | 73/116 |
| 5,385,129 | 1/1995 | Eyberg | 123/436 |
| 5,503,007 | 4/1996 | Plee et al. | 73/117.3 |
| 5,574,217 | 11/1996 | McCombie | 123/419 X |

FOREIGN PATENT DOCUMENTS

90/02871 3/1990 WIPO .
91/11599 8/1991 WIPO .

*Primary Examiner*—Tony M. Argenbright
*Attorney, Agent, or Firm*—Foley & Lardner

[57] ABSTRACT

Acceleration corresponding to individual cylinders can be measured by an apparatus. The apparatus comprises a crankshaft position sensor providing position signals, and a device including a programmed control unit. The device measures a first time period of rotation through a first rotation interval defined by first selected position signals separated by a first angle of rotation. It measures a second time period of rotation through a second rotation interval defined by second selected position signals separated by a second angle of rotation. It also measures a third time period of rotation between the first and second rotation intervals. Each of the first and second rotation intervals includes a selected power stroke. The first instantaneous speed is calculated as a function of the first measured time period and the second instantaneous speed is calculated as a function of the second measured time period. The device calculates a ratio of the difference between the first and second calculated instantaneous speeds to the third measured time period and determines the acceleration based on the calculated ratio.

25 Claims, 16 Drawing Sheets

INDIVIDUAL CYLINDER COMBUSTION STATE DETECTION FROM ENGINE CRANKSHAFT ACCELERATION

BACKGROUND OF THE INVENTION

The present invention relates to measurement of acceleration corresponding to individual cylinders of an internal combustion engine, and more particularly to a method, and corresponding apparatus, for measuring acceleration corresponding to the engine individual cylinders during engine operation.

In the typical four-stroke internal combustion engine, the four strokes include the intake stroke, the compression stroke, the power stroke, and the exhaust stroke. One engine cycle is comprised of 720 degrees of crankshaft rotation during which each cylinder passes through each of its four strokes.

Gas pressure from combustion in a properly firing cylinder accelerates the engine crankshaft during the power stroke of that particular cylinder. If a cylinder fails to properly fires or produce power, then friction, compression in other cylinders, and external load combine to produce a net deceleration during the power stroke. By virtue of its mass and the arrangement of cylinders, an engine is intentionally designed to provide smooth rotation. Therefore, the speed changes resulting from the accelerations and decelerations are small compared to total rotational speed.

Recently, there is growing demand to set, as a desired air fuel ratio, a lean air fuel ratio greater than the stoichiometry air fuel ratio for idle operation at cold engine in order to suppress production of exhaust contaminants. If the lean air fuel ratio is set as the desired air fuel ratio, the engine tends to vibrate at a considerably high level, thereby considerably impairing comfortable ride feel and start-up performance. This high level of engine vibrations at idle operation attributes mainly to:

a) Combustion speed variation between cylinders due to irregularity in configuration between air intake pipes connected to the cylinders and to unevenness in intake air amount between the cylinders by intake interference, and to difference in gas flow between the cylinders;

b) Difference in combustion temperature between the cylinders due to engine coolant passage, c) Dispersion in cylinder volume and piston configuration between the cylinders, d) Dispersion in air fuel ratio between the cylinders due to fuel injection amount by manufacturing tolerance of fuel injectors.

The vibration level, during engine operation at idle, can be lowered if combustion state variations between cylinders is condensed.

U.S. Pat. No. 5,016,591 (=JP-A 2-64252) proposes an apparatus for controlling an internal combustion engine wherein crankshaft speed during the power stroke of each of the engine cylinders is detected. When the engine is idling, the average of readings of crankshaft speed of one cylinder is compared with that of the adjacent one of the other cylinders to calculate a deviation between them. Control parameters, such as basic spark timing amounts or basic fuel injection amount, on combustion within the one and the adjacent one cylinders are altered in such directions as to reduce the deviation toward zero.

According to this known apparatus, a time period of rotation through a rotation interval within each power stroke is measured. In other words, measurement of the time period or sampling is made once during each power stroke. The difference between the measured time period during one power stroke and that during the preceding power stroke is calculated for each cylinder. This calculated difference is considered as a value representative of torque produced by a particular cylinder. This value, however, results from contribution from the power stroke of one particular cylinder and that from the power stroke of another cylinder, failing to represent torque of a particular cylinder. With the same cylinder torque, the calculated difference provides different values for different engine speeds at idling. Desired idle speed gradually changes for changes in engine coolant temperature or it increases in response to application of external load by switching-on of an air conditioner of other electrical accessory.

Accordingly, an object of the present invention is to provide a method of and the corresponding apparatus for measuring acceleration corresponding to the power stroke of individual cylinders of an internal combustion engine.

SUMMARY OF THE INVENTION

According to one aspect of the present invention, there is provided an apparatus for measuring acceleration corresponding to power strokes of individual cylinders of an internal combustion engine, comprising:

a position sensor providing position signals at predetermined points of the rotation of the engine's crankshaft, said predetermined points being at regularly spaced rotation angles such that at least one position signal occurs during every power stroke; and a device, connected to said sensor, measuring a first time period of rotation through a first rotation interval defined by first selected position signals separated by a first angle of rotation and measuring a second time period of rotation through a second rotation interval defined by second selected position signals separated by a second angle of rotation, and measuring a third time period of rotation between said first and second rotation intervals, each of said first and second rotation intervals including a selected power stroke, said device calculating a first instantaneous speed as a function of said first measured time period and calculating a second instantaneous speed as a function of said second measured time period, said device calculating a ratio of the difference between said first and second calculated instantaneous speeds to said third measured time period, said device determining the acceleration based on said calculated ratio.

The apparatus further comprises a second sensor providing reference marker signals at second predetermined points of rotation of the engine's crankshaft, said second predetermined points being at regularly spaced rotation angles such that one reference signal occurs during every power stroke.

In the apparatus, the device measures a fourth time period of rotation through a third rotation interval defined by a selected reference marker signal immediately preceding said first and second selected position signals and the reference marker signal immediately preceding said selected reference marker signal.

In the apparatus, the device calculates a deviation of said fourth measured time period associated with said selected power stroke from that associated with the preceding power stroke.

In the apparatus, the device compares the absolute value of said calculated deviation with a predetermined value, and identifies a cylinder to which said selected power stroke corresponds. The device stores or collects said calculated ratio as one of samples for said identified cylinder when the absolute value of said calculated deviation is less than said predetermined value.

In the apparatus, the device determines a correction factor by dividing said fourth measured time period by a selected normalized constant and determines an instantaneous acceleration by subtracting said determined correction factor from said calculated ratio.

In the apparatus, the device calculates the average of a predetermined number of collected samples; and sets said calculated average as the acceleration corresponding to said identified cylinder.

In the apparatus, said first rotation interval occurs near the beginning of each power stroke and said second rotation interval occurs halfway between the beginning of one power stroke and the beginning of successive power stroke.

In the apparatus, said position sensor may comprise:
a rotor for rotation with the crankshaft having reference marks at predetermined positions; and
a stationary pickup sensing the passage of said reference marks.

The position sensor may further comprises:
a rotor for rotation with the crankshaft having reference marks at predetermined positions; and
a plurality of stationary pickups, each sensing the passage of said reference marks.

The plurality of stationary pickups are arranged along the periphery of said rotor at regularly spaced rotation angles such that a portion of said reference marks passes one of said plurality of stationary pickups during every power stroke.

According to another aspect of the present invention, there is provided a method of measuring acceleration corresponding to power strokes of individual cylinders of an internal combustion engine, comprising the steps of:
providing position signals at predetermined points of the rotation of the engine's crankshaft, said predetermined points being at regularly spaced rotation angles such that at least one position signal occurs during every power stroke;
measuring a first time period of rotation through a first rotation interval defined by first selected position signals separated by a first angle of rotation;
measuring a second time period of rotation through a second rotation interval defined by second selected position signals separated by a second angle of rotation;
measuring a third time period of rotation between said first and second rotation intervals, each of said first and second rotation intervals including a selected power stroke,
calculating a first instantaneous speed as a function of said first measured time period;
calculating a second instantaneous speed as a function of said second measured time period,
calculating a ratio of the difference between said first and second calculated instantaneous speeds to said third measured time period; and
determining the acceleration based on said calculated ratio.

DETAILED DESCRIPTION OF THE INVENTION

Figure 1:
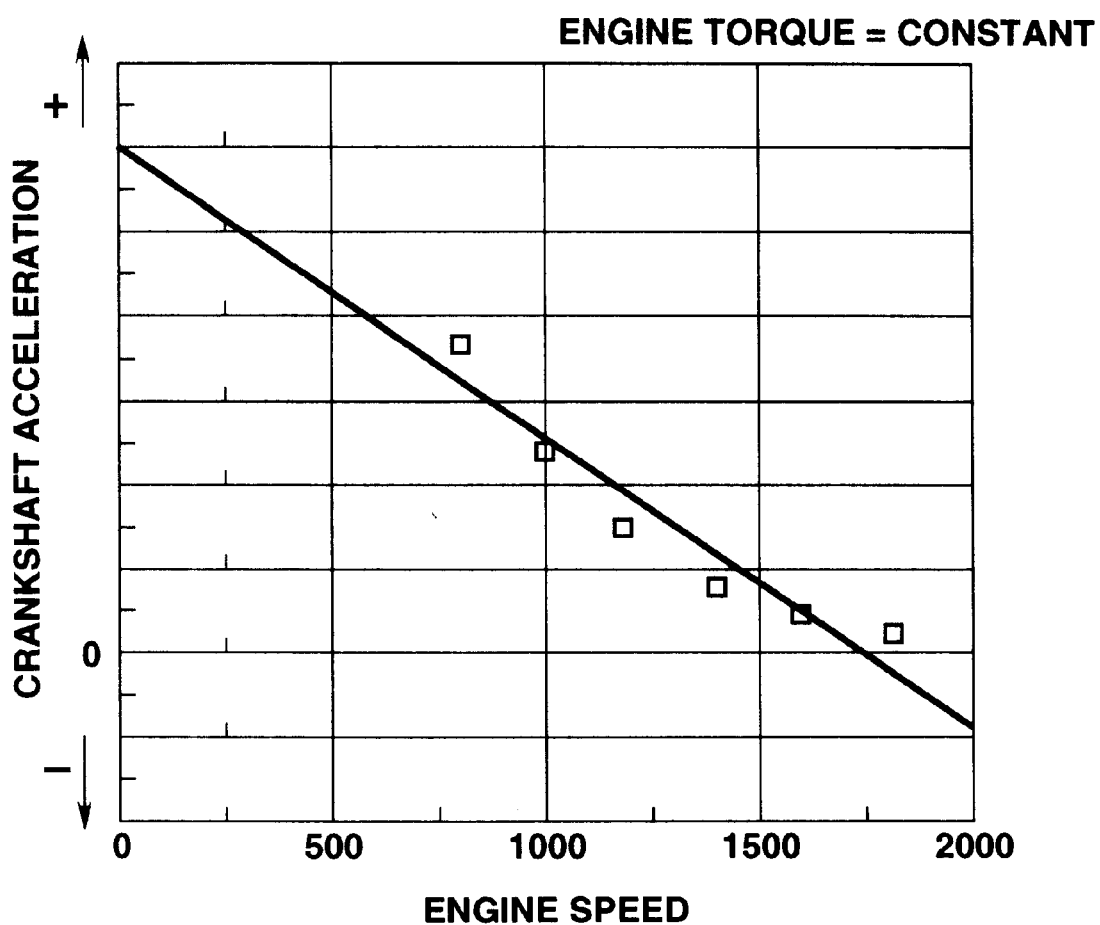
FIG. 1 is a chart of plotting varying readings of a ratio DOMGi, which have been obtained, with the same engine torque, against various engine speeds.

Referring to FIG. 1, there are plotted readings of the ratio DOMGi, which result from measurement of instantaneous speeds at two rotation intervals during each power stroke. Measurement of instantaneous speed has been conducted with the same engine torque and against various engine speeds. An oblique line is drawn passing through an area where the readings are plotted to show distribution of such plotting against engine speed. During a power stroke, friction and compression in other cylinders combine to produce a net deceleration. Deceleration differs with different engine speeds. Differing deceleration tendency against engine speeds causes this distribution. This ratio DOMGi cannot be used as an input signal of a closed loop engine performance control system because the same reading of the ratio corresponds to one torque at low engine speed and another different torque at high engine speed.

Referring to the drawings, wherein the showings are for purposes of illustrating a preferred embodiment of the present invention only and not for purposes of limiting it.

Figure 2:
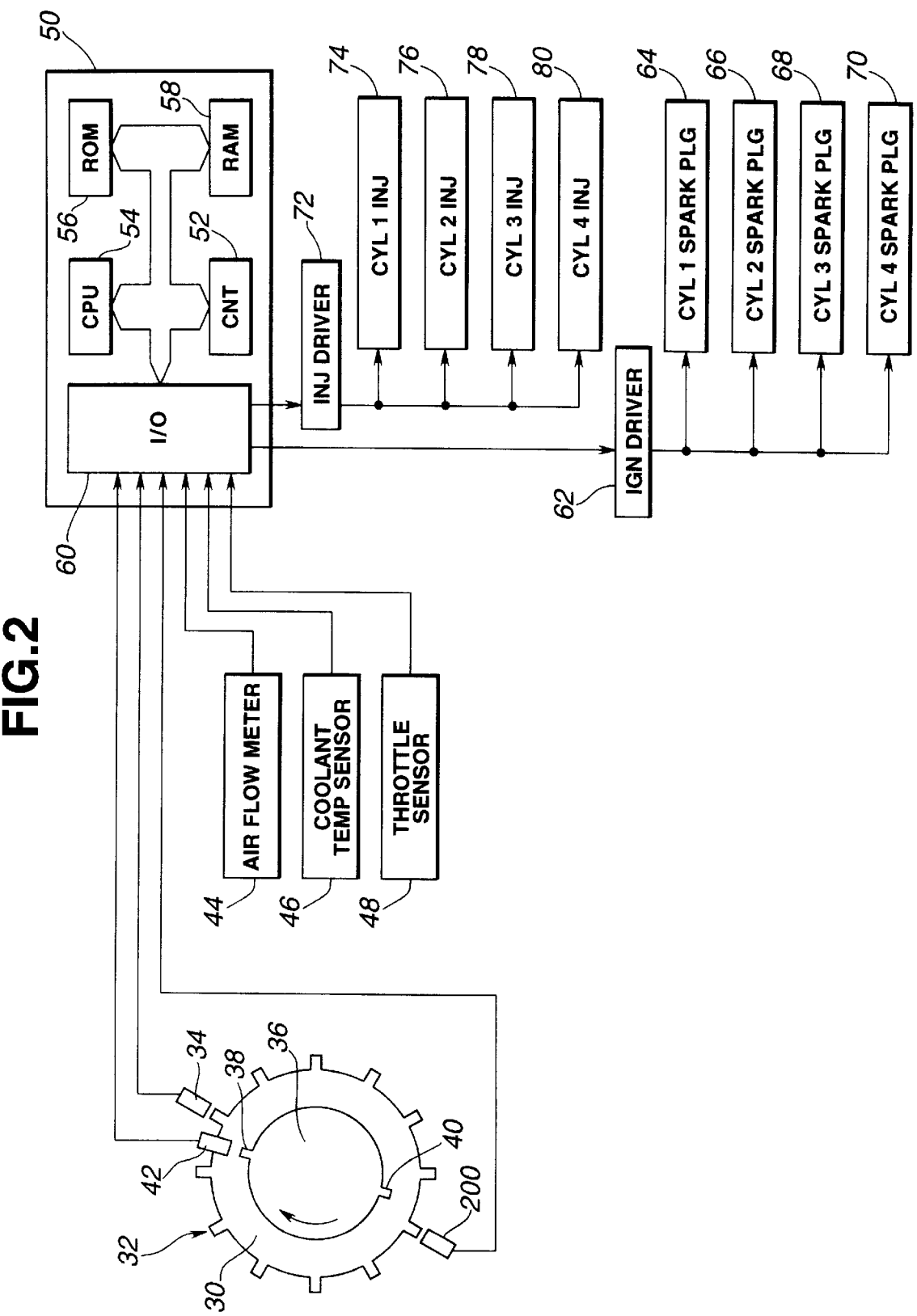
FIG. 2 is a schematic block diagram illustration of apparatus employed in accordance with the present invention.

FIG. 2 illustrates an apparatus for controlling a multiple-cylinder engine. In the example given herein, the engine is a fuel injected spark ignited engine having four cylinders in line. The firing order of the cylinders is 1-4-3-2. This is a four-cycle engine, which means that the crankshaft requires two revolutions for all cylinders to fire. The crankshaft carries a multi-toothed crankshaft position wheel 30 provided with 360 evenly spaced teeth 32.

Figure 3:
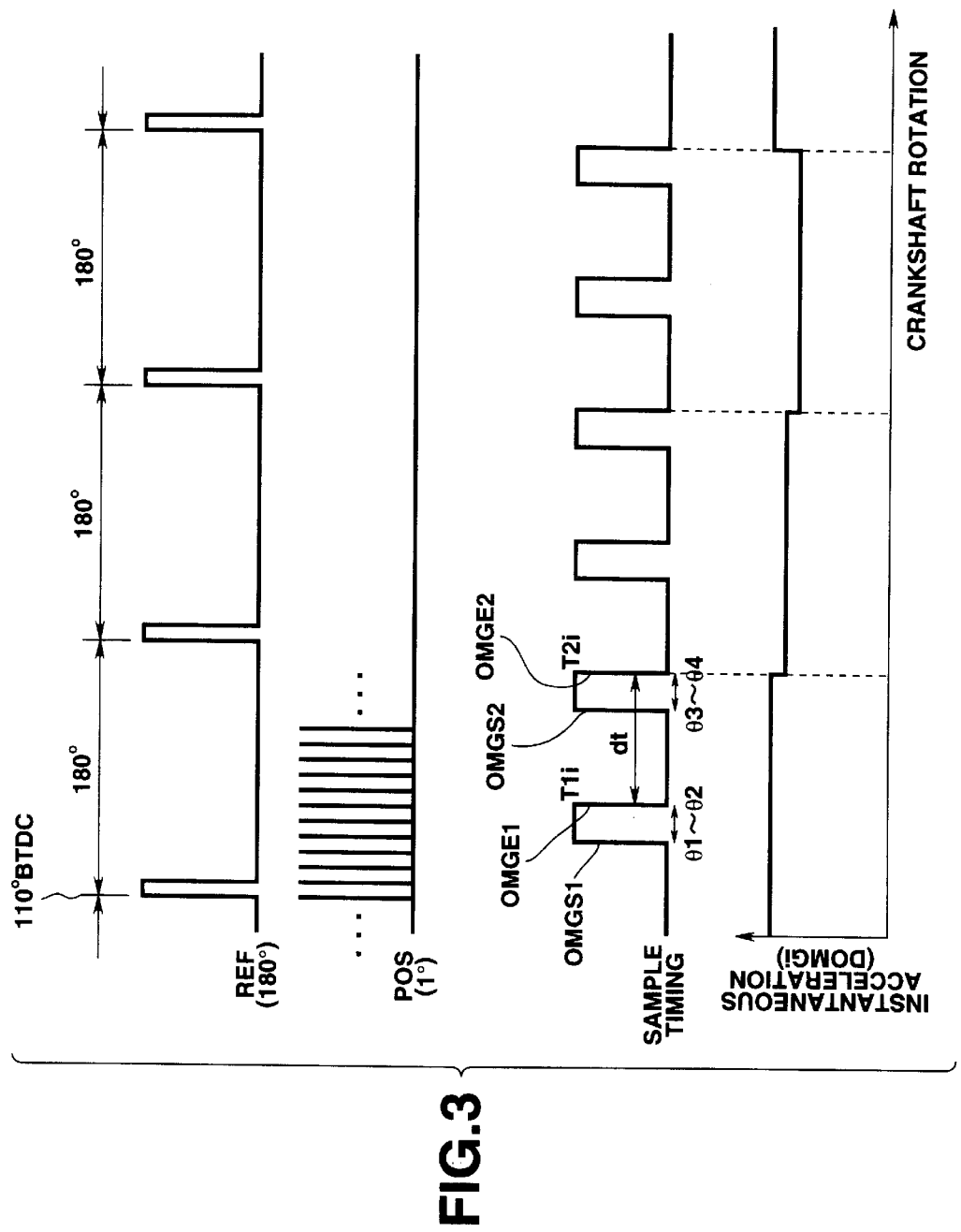
FIG. 3 is a chart illustrating a pair of first and second rotation intervals for instantaneous crankshaft speed measurement for each power stroke as the engine crankshaft is being driven through at least one engine cycle for providing the ratio DOMGi for each cylinder.

The engine controlling apparatus employs a position (POS) sensor 34 for sensing the passage of each wheel teeth 32 at a particular point. This is accomplished by mounting a suitable reluctance or magnetic type sensor on the engine housing so that the sensor 34 is positioned to produce one crankshaft position (POS) pulse signal for each tooth 32 of the wheel 30. Thus, for each revolution of the crankshaft, the POS sensor 34 will provide a total of 360 POS pulses as shown in FIG. 3. Since one engine cycle requires two revolutions of the crankshaft, 720 POS pulses will be produced for each engine cycle. Since the engine being described is a four-cylinder engine, each engine cycle will include four power or acceleration strokes.

It is desirable to obtain information to relate the POS pulses to crankshaft positions. More specifically, what is needed is information to relate the POS pulses to angles of crankshaft rotation with respect to each top dead center (TDC) position to make it easier to locate a crankshaft position for initiating fuel injection and a crankshaft position for producing a spark for each cylinder. This is accomplished by producing one pulse, referred herein as a reference (REF) marker pulse, for each power stroke so that each REF marker signal is associated with a crankshaft position before one of four TDC positions in the engine cycle. Preferably, a total of four REF marker pulses are produced so as to be essentially coincident with four of the POS pulses. In this example, as shown in FIG. 3, each REF marker pulse is produced at a crankshaft position 110 degrees of crankshaft rotation before TDC. A disc 36 may be mounted to the exposed end of the crankshaft with the disc carrying suitable markers 38 and 40. The location of the marker 38 has a crankshaft relationship to one particular tooth on the wheel 30, while the location of the other marker 40 has a crankshaft relationship to another particular tooth on the wheel 30. This another particular tooth is spaced from the one particular tooth along the periphery of the wheel 30 through 180 degrees. A suitable magnetic or reluctance type sensor 42 serves as the reference (REF) marker sensor to produce four REF pulses for each engine cycle.

As noted in FIG. 2, an air flow meter 44 measures mass flow of intake air admitted to the cylinders to provide an electrical voltage corresponding to the measured mass flow. A coolant temperature sensor 46 measures the temperature of engine to provide an electrical voltage signal corresponding to the measured temperature. A throttle sensor 48 includes an idle switch that is closed when the engine throttle valve is closed to assume an idle position. The outputs of the air flow meter 44, the coolant temperature sensor 46 and the idle switch of the throttle sensor 48 are supplied to a control unit 50.

The control unit 50 includes a counter 52, a central processor unit (CPU) 54, a read only memory (ROM) 56, a random access memory (RAM) 58 and an input and output (I/O) control 60. The POS pulses are supplied to the I/O control 60 and REF marker pulses are supplied via the I/O control to the counter 52. A clock signal is provided to the counter 52 by a clock generator. The counter 52 will count the elapsed time TREF between the REF marker pulses. The instantaneous speed during the interval between the REF marker signals is inversely proportional to the elapsed time TREF.

The I/O control 60 is connected to an ignition driver 62. The ignition driver 62 has connected thereto spark plugs for the cylinders, respectively. The spark plugs include a cylinder No. 1 spark plug 64, a cylinder No. 2 spark plug 66, a cylinder No. 3 spark plug 68 and a cylinder No. 4 spark plug 70. The I/O control 60 is also connected to a fuel injection driver 72. The fuel injection driver 72 has connected thereto fuel injectors for the cylinders, respectively. The fuel injectors include a cylinder No. 1 fuel injector 74, a cylinder No. 2 fuel injector 76, a cylinder No. 3 fuel injector 78 and a cylinder No. 4 fuel injector 80.

Referring to FIG. 3, the control unit 50 will gather, as two interval samples, first and second time periods T1i and T2i of rotation and a third time period of rotation or the elapsed time dt between the sampling points for each power stroke for storage. Once the samples have been taken for this power stroke, the control unit 50 may make evaluation of the time interval samples. In this evaluation, the fourth period of time, i.e., the elapsed time, TREF between one REF pulse immediately preceding the two interval samples and the REF pulse immediately preceding the one REF pulse is compared with the old value of the fourth period of time TREFO between the preceding REF pulse and the one REF pulse before the preceding REF pulse. If an absolute value of the difference DTREF between TREF and TREFo is not less than a feedback enabling value FBEN, the two interval samples T1i and T2i and the third period of time dt are not employed. If DTREF is less than FBEN, the control unit 50 identifies the cylinder to which the two interval samples T1i and T2i correspond. The two interval samples T1i and T2i and the third period of time dt are used to give a ratio DOMGi by calculating the following formula:

$$DOMGi=(K/T1i-K/T2i)/dt \quad (1)$$

where: K is an angular length of crankshaft rotation through each of first and second rotation intervals for speed measurement.

As discussed before, the ratio DOMGi needs correction, and thus the control unit 50 corrects DOMGi to provide instantaneous acceleration DHOMGi by calculating the formula:

$$DHOMGi=DOMGi-(TREF/KDLT) \quad (2)$$

where: KDLT is the normalized constant.

A sufficient number of samples DHOMGi should be taken for a predetermined number FBPD of engine cycles for calculating cylinder average OMGAVi for each cylinder and all cylinder average AOMGAV. The cylinder average OMGAVi and all cylinder average AOMGAV are used to obtain respective deviations DDOMGi for the cylinders in the firing order of 1-3-4-2. The respective deviations DDOMGi for the cylinders are compared with a predetermined window. If the deviations DDONGi fall in the predetermined window, fuel injection and ignition timing for the cylinders are left unaltered. If the deviation DDOMGi for one cylinder falls outside the predetermined window, the amount of fuel injection and/or the degree of advance of ignition timing for the one cylinder are altered.

Figure 4:
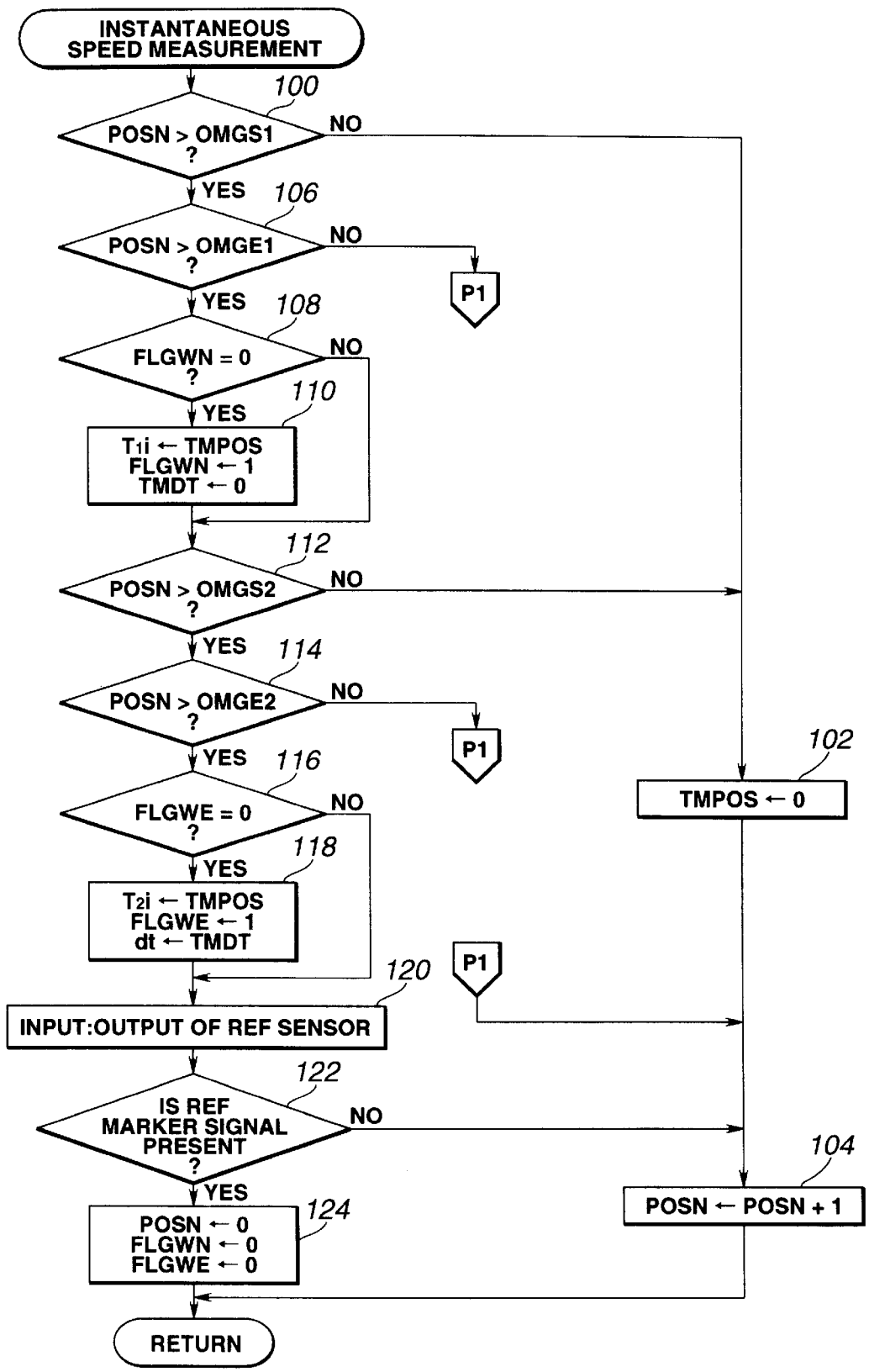
FIG. 4 is a flow chart of a routine for measurement of instantaneous speeds at the first and second rotation intervals for each power stroke.

FIG. 4 is a flow chart of a sub-routine for gathering, as two interval samples, the first and second time periods of rotation T1i and T2i and the third period of time of rotation, i.e., the elapsed time, dt between the two rotation intervals for each power stroke for storage. The two rotation intervals for speed measurement for each power stroke may conveniently be named a first rotation or speed measurement interval and a second rotation or speed measurement interval. As shown in FIG. 3, the first measurement interval begins with a crankshaft angle of OMGS1 and ends with a crankshaft angle of OMGE1, while the second measurement interval begins with a crankshaft angle of OMGS2 and ends with a crankshaft angle of OMGE2. Execution of this sub-routine is initiated by POS pulse.

In step 100, the routine determines whether a counter POSN is greater than OMGS1 that marks the start of the first speed measurement interval. If POSN is not greater than OMGS1, that is, the crankshaft angle has not reached the first measurement interval yet, the routine clears a timer TMPOS in step 102 and increments POSN in the next step 104. The routine repeats the above steps 100, 102 and 104 for the successive crankshaft angles until the crankshaft angle becomes equal to OMGSi. Timer TMPOS receives a clock pulse from a built-in generator and counts upwards unless it is reset.

Immediately after the crankshaft angle has entered the first measurement interval, the routine goes from step 100 to step 106 where it determines whether or not POSN is greater than OMGE1 that marks the end of the first measurement interval. Since, in step 106, POSN is not greater than OMGE1, the routine increments POSN in step 104. The routine repeats steps 100, 106 and 102 for the successive crankshaft angles until the crankshaft angle becomes equal to OMGE1. Immediately after the crankshaft angle has exceeded OMGE1, the routine goes through steps 100 and 106 to step 108 where it determines whether or not a first scheduling flag FLGWN is equal to 0 (zero). Since FLGWN is initially equal to 0 (zero), the routine goes from step 108 to step 110. In step 110, the routine sets the content of timer TMPOS as first interval sample T1i. In step 110, the routine sets the first scheduling flag FLGWN equal to 1 (one) and clears a sampling timer TMDT. The suffix i represent numbers assigned the cylinders, respectively. The suffix i may be 1 or 2 or 3 or 4.

The timer TMDT receives a clock pulse from the built-in timer and counts upward unless it is reset.

Once the first scheduling flag FLGWN is set equal to 1 (one), the routine goes through steps 100, 106 and 108 to step 112: In step 112, the routine determines whether or not POSN is greater than OMGS2 that marks the beginning of the second measurement interval. Then, the routine resets TMPOS in step 102 and increments POSN in step 104. The routine repeats steps 100, 106, 108, 112, 102 and 104 for the succeeding crankshaft angles until the crankshaft angle becomes equal to OMGS2. Immediately after the crankshaft angle has entered the second measurement interval, the routine goes from step 112 to step 114.

In step 114, the routine determines whether or not POSN is greater than OMGE2 that marks the ending of the second measurement interval. When the crankshaft angle falls in the second measurement interval, the routine goes from step 114 to step 104 where it increments POSN. The routine repeats steps 100, 106, 108, 112, 114 and 104 for the succeeding crankshaft angles until the crankshaft angle becomes equal to OMGE2. Immediately after the crankshaft angle has exceeded OMGE2, the routine goes through steps 100, 106, 108, 112, and 114 to step 116 where it determines whether or not a second scheduling flag FLGWE is set equal to 0 (zero). Since FLGWE is initially equal to 0 (zero), the routine sets the content of timer TMPOS as the second interval sample T2i in step 118. In step 118, the routine sets the second scheduling flag FLGWE equal to 1 (one), and sets the content of the sampling timer TMDT as the elapsed time dt. After step 118, the routine inputs the output of the REF sensor 42 and determines whether or not REF pulse is present in the next step 122. If, in step 122, REF pulse is not available, the routine increments POSN in step 104.

After the second scheduling flag FLGWE becomes equal to 1 (one), the routine 50 goes through steps 100, 106, 108, 112, 114, 116 and 120 to step 122. Immediately after REF pulse has been produced, the routine goes from step 122 to step 124 where it clears POSN, first scheduling flag FLGWN and second scheduling flag FLGWE. The interval samples T1i and T2i as well as the elapsed time dt are protected for use in routine shown in FIGS. 5A and 5B.

Figure 5A:
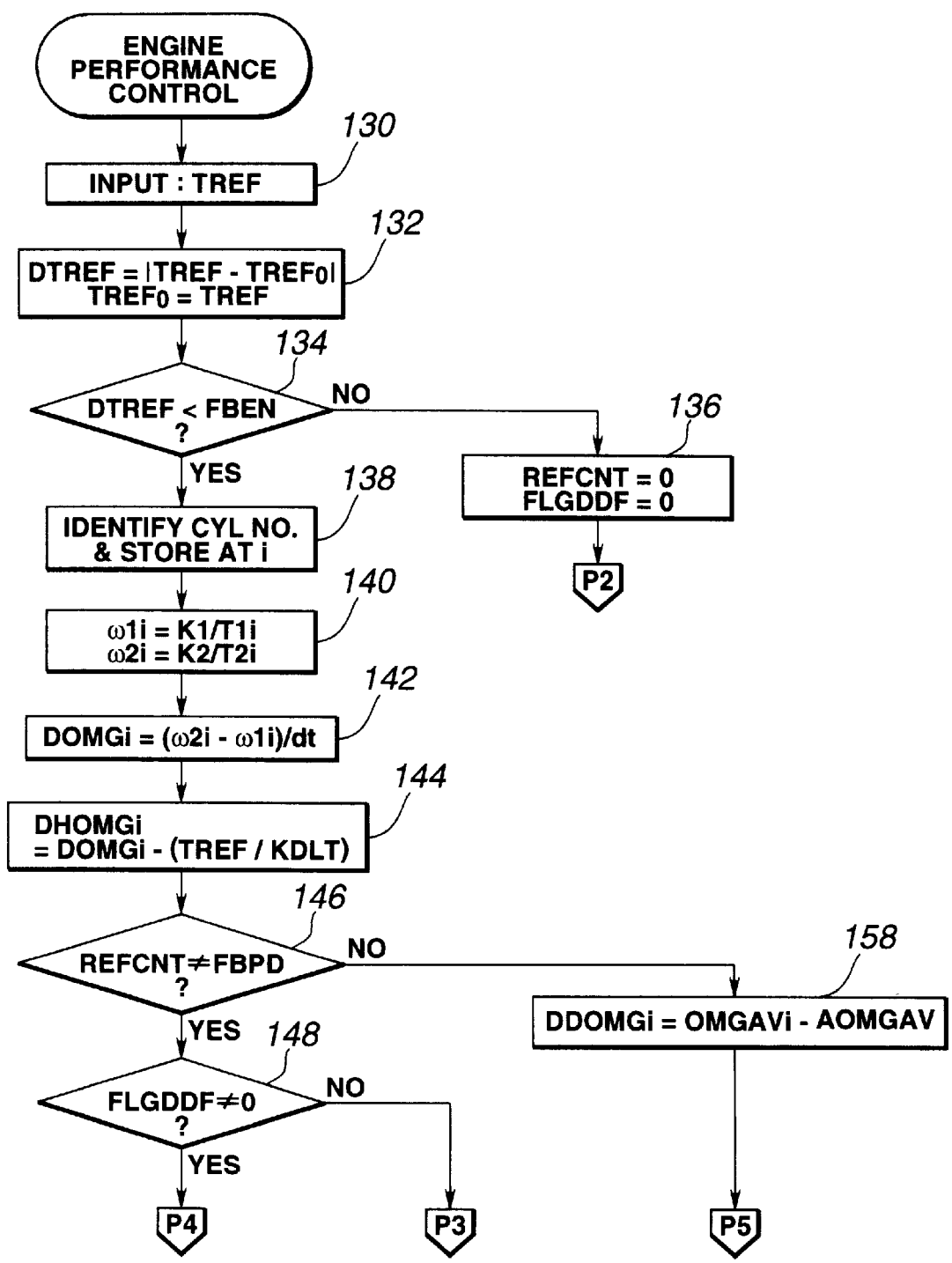
FIGS. 5A and 5B are a flow chart of a routine for engine performance control at idle operation by minimizing fluctuations of cylinder power between cylinders.
Figure 5B:
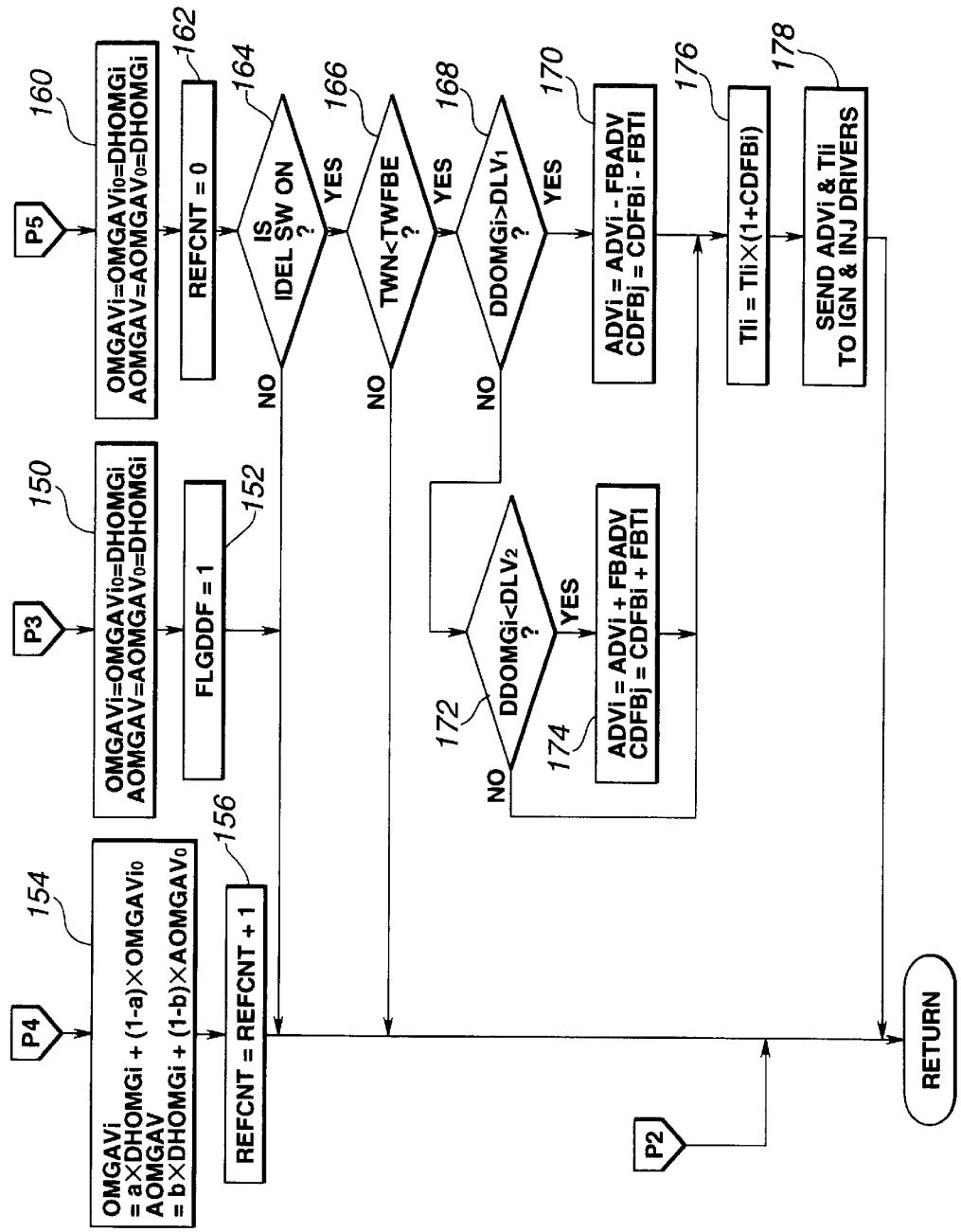

Execution of the routine shown in FIGS. 5A and 5B is initiated by REF pulse. In this routine, using the interval samples T1i and T2i as well as the elapsed time dt, the ratio DOMGi is calculated if the difference DTREF is less than the feedback enabling value FBEN. Then, the instantaneous acceleration DHOMGi is calculated.

In step 130 of FIG. 5A, the routine looks into the counter 52 and inputs TREF. In the next step 132, the routine calculates an absolute value DTREF of difference between TREF and an old value TREFo thereof, and then sets TREF as TREFo. In the next step 134, the routine determines whether or not DTREF is less than predetermined feedback enabling value FBEN.

If, in step 134, DTREF is not less than FBEN, the routine goes to step 136 where it resets a reference counter REFCNT and an initialization flag FLGDDF. If, in step 134, DTREF is less than FBEN, the routine identifies one cylinder to which the interval samples T1i and T2i correspond and stores the number of this cylinder as i in step 138.

The following steps are performed for individual cylinders, respectively.

In step 140, the routine determines first instantaneous angular speed $\omega 1i$ and second instantaneous angular speed $\omega 2i$ by calculating the formulas:

$$\omega 1i = K1/T1i \tag{3}$$

$$\omega 2i = K2/T2i \tag{4},$$

where: K1 is an angular length of crankshaft rotation between OMGS1 and OMGE1, and K2 is an angular length of crankshaft rotation between OMGS2 and OMGE2.

In step 142, the routine determines instantaneous crankshaft acceleration DOMGi by calculating the formula:

$$\text{DOMGi} = ((\omega 2i - \omega 1i)/dt \tag{5}.$$

In step 144, the routine corrects DOMGi to give DHOMGi by calculating the equation (2).

With this correction, contribution made by the net deceleration due to compression stroke of other cylinders and friction to DOMGi is removed or at least minimized.

In the next step 146, the routine determines whether or not reference counter REFCNT is not equal to FBPD, that is, whether or not REFCNT has reached FBPD. If, in step 146, REFCNT is not equal to FBPD, the routine determines, in step 148, whether or not the initialization flag FLGDDF is not equal to 0 (zero). Assuming now that the counter REFCNT is equal to 0 (zero) and the flag FLGDDF is reset, the routine goes from step 146 to step 148 and then to step 150 (see FIG. 5B). In step 150, the routine sets average of individual cylinder acceleration OMGAVi and an old value $\text{OMGAVi}_0$ thereof equal to DHOMGi, respectively. In the same step 150, it also sets the average of all cylinder acceleration AOMGAV and an old value $\text{AOMGAV}_0$ thereof equal to DHOMGi, respectively. In the next step 152, the routine sets the initialization flag FLGDDF equal to 1 (one).

After the flag FLGDDF has been set equal to 1 (one) in step 152, the routine goes from step 148 to step 154 (see FIG. 5B). In step 154, the routine determines average of individual cylinder acceleration OMGAVi and average of all cylinder acceleration AOMGAV by calculating the following formulas, respectively.

$$\text{OMGAVi} = a \times \text{DHOMGi} + (1-a) \times \text{OMGAVi}_0 \tag{6}$$

$$\text{AOMGAV} = b \times \text{DHOMGi} + (1-b) \times \text{AOMGAV}_0 \tag{7}$$

where, weighted average coefficients a and b are less than 1 (one).

In the step 154, $\text{OMGAVi}_0$ is updated with OMGAVi and $\text{AOMGAV}_0$ is updated with AOMGAV.

In the next step 156, the routine increments the counter REFCNT. Calculation in step 154 is repeated as long as the initialization flag FLGDDF continues to be equal to 1 (one) until the counter REFCNT reaches FBPD.

When, in step 146, the counter REFCNT is equal to FBPD, the routine goes to step 158. In step 158, the routine determines a deviation DDOMGi by calculating the formula:

$$DDOMGi=OMGAVi-AOMGAV \qquad (8).$$

In the next step 160, OMGAVi, $OMGAVi_0$, AOMGAV and $AOMGAV_0$ are initialized with DHOMGi in the same manner as in step 150. In the next step 162, the counter REFCNT is reset.

The following steps 164 and 166 specify conditions that are to be complied with prior to initiating a feedback control. In step 164, the routine determines whether or not idle switch of the throttle sensor 48 is turned ON. In step 166, the routine determines whether or not coolant temperature TWN, which is detected at the coolant temperature sensor 46, is less than a predetermined allowable temperature value TWFBE. If at least one of these two conditions fails to be met, the routine returns to its start point.

If both of these conditions recited in steps 164 and 166 are met, the routine determines in step 168 whether or not the deviation DDOMGi is greater than an upper limit DLV1 of a predetermined window. If DDOMGi is greater than the upper limit DLV1, the routine modifies, in step 170, ignition timing ADVi for cylinder i and a fuel injection amount to be injected to the cylinder i by altering a correction coefficient CDFBi. Specifically, in step 170, the routine decreases ADVi by an ignition timing feedback gain FBADV and at the same time it decreases the correction amount CDFBi by a fuel injection feedback gain FBTi.

If, in step 168, the deviation DDOMGi is not greater than the upper limit DLV1, the routine determines, in step 172, whether or not DDOMGi is less than a lower limit DLV2 of the predetermined window. If DDOMGi is less than the lower limit DLV2, the routine modifies, in step 174, spark advance ADVi for cylinder i and a fuel injection amount to be injected to the cylinder i by altering correction coefficient CDFBi. Specifically, in step 174, the routine increases ADVi by the spark advance feedback gain FBADV and at the same time it increases the correction coefficient CDFBi by the fuel injection feedback gain FBTi.

After the step 174 or 170, the routine modifies, in step 176, fuel injection amount TIi using the correction coefficient CDFBi. In step 176. TIi is updated by multiplying TIi with (1+CDFBi). In the next step 178, the routine sends ADVi and TIi to the ignition and fuel injection drivers 62 and 72, respectively.

If, in step 172, the deviation DDOMGi is not less than the lower limit DLV2, that is, the deviation DDOMGi falls in the predetermined window, the routine leaves ADVi and CDFBi unmodified before going to steps 176 and 178.

According to the first embodiment, the individual cylinder instantaneous acceleration DHOMGi is used in calculating average of individual cylinder acceleration OMGAVi and average of all cylinders acceleration AOMGAV over a sufficient number of engine cycles. Each time when REFCNT has reached FBEN, the deviation DDOMGi is calculated and then compared with the predetermined window that has a width fixed. The ignition timing and fuel injection amount for a cylinder are modified when the deviation DDOMGi, which corresponds to the cylinder, falls outside the predetermined window.

In the second embodiment, the individual cylinder acceleration DOMGi, which is left uncorrected, is used in calculating average of individual cylinder acceleration OMGAVi and average of all cylinders acceleration AOMGAV over a sufficient number of engine cycles. Each time when REFCNT has reached FBEN, the deviation DDOMGi is calculated and compared with a predetermined window, which is defined by a corrected upper limit HDLV1 and a corrected lower limit HDLV2 that increase as engine speed decreases. The corrected upper limit HDLV1 results from summation of DLV1 and TREF/KDLT, while the corrected lower limit HDLV2 results from summation of DLV2 and TREF/KLDT. Ignition timing and fuel injection amount to one cylinder are modified when the deviation DDOMGi falls outside this predetermined window.

Except for the above-mentioned difference, the second embodiment is substantially the same as the first embodiment. In other words, the second embodiment is substantially the same as the first embodiment, but it is different from the first embodiment in that a routine shown in FIGS. 6A and 6B is used instead of the routine shown in FIGS. 5A and 5B.

Figure 6A:
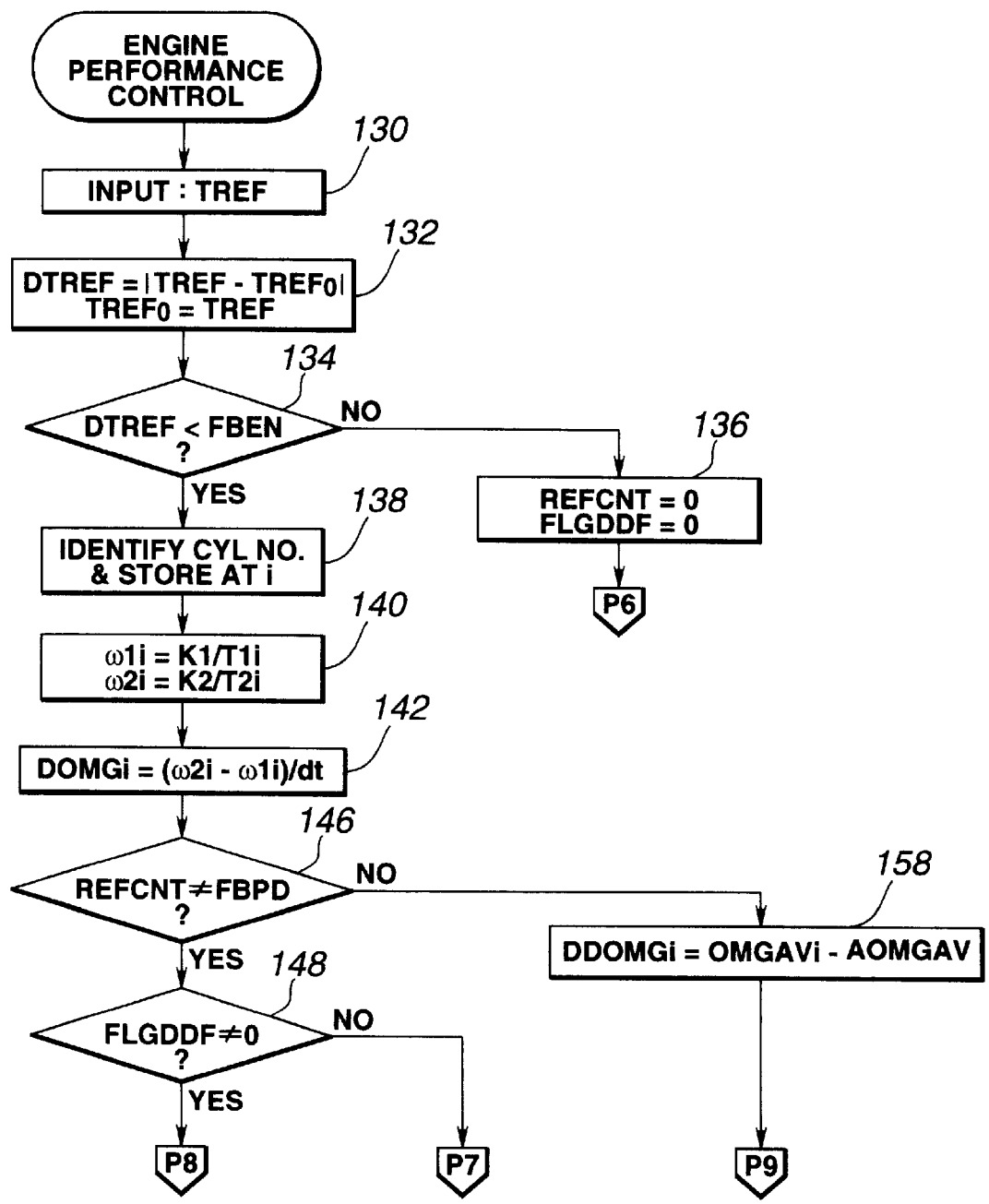
FIGS. 6A and 6B are a flow chart of a modification of the routine shown in FIGS. 5A and 5B.
Figure 6B:
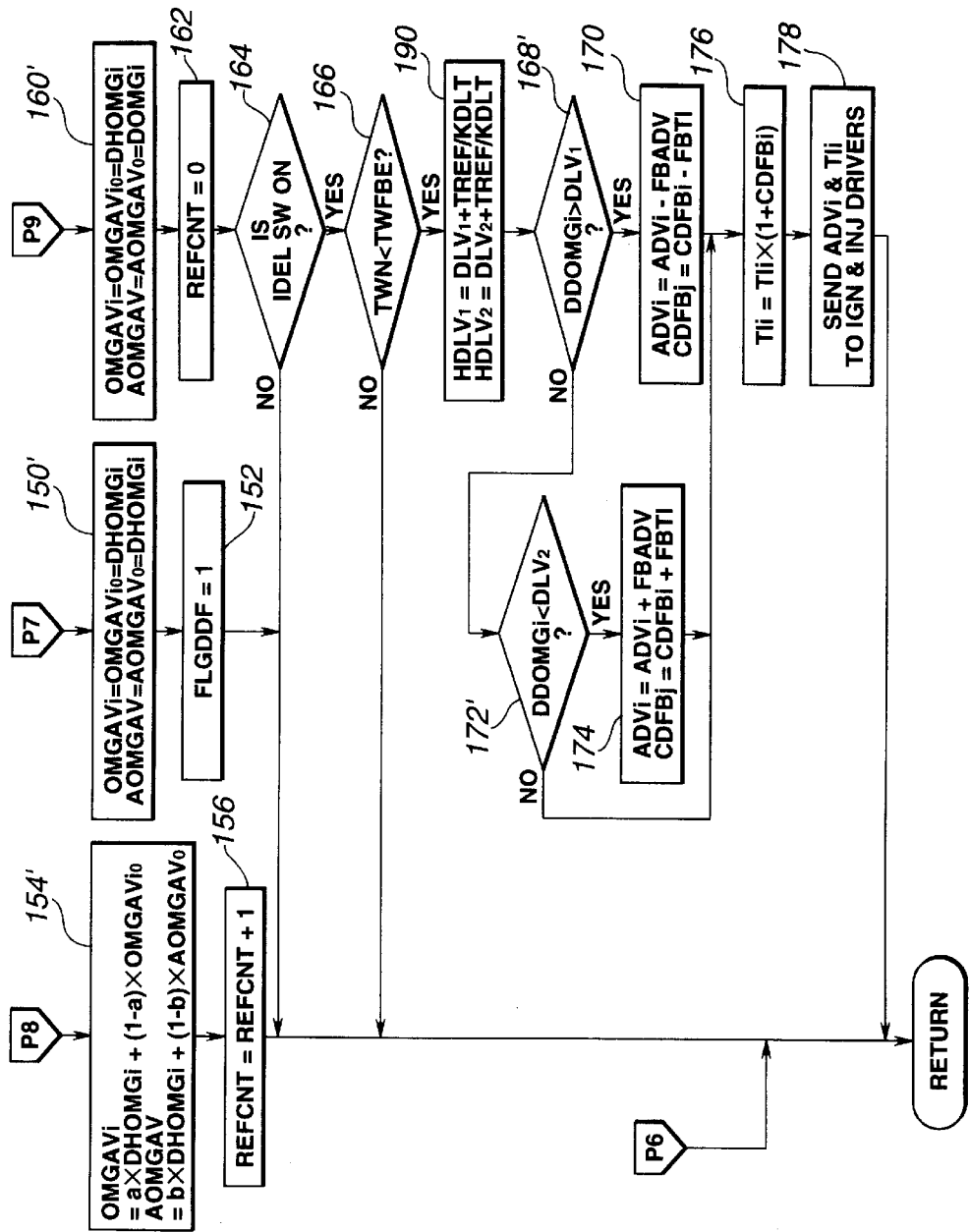

Comparing the routine of FIGS. 6A and 6B with that of FIGS. 5A and 5B reveals that the step 144 in FIG. 5A, which is disposed between the steps 142 and 148, has been cancelled in FIG. 6A. The steps 154, 150 and 160 in FIG. 5B have been replaced with steps 154', 150' and 160' in FIG. 6B, respectively. In steps 154', 150' and 160', the ratio DOMGi, which is left uncorrected, is used. In FIG. 6B, step 190 is disposed immediately after positive output of interrogation step 166. In step 190, upper and lower limits DLV1 and DLV2 are corrected to give corrected upper and lower limits HDLV1 and HDLV2. In FIG. 6B, modified interrogation steps 168' and 172' have replaced steps 168 and 172 shown in FIG. 5B, respectively. In step 168', deviation DDOMGi is compared with the corrected upper limit HDLV1 and it is compared with the corrected lower limit HDLV2 in step 172'.

In step 150', the routine sets each of OMGAVi, OMGAVio AOMGAV and AOMGAVo equal to DOMGi. In step 154', the routine determines the average of individual cylinder acceleration OMGAVi and that of all cylinders acceleration AOMGAV by calculating the formulas:

$$OMGAVi = a \times DOMGi + (1-a) \times OMGAVio \qquad (9)$$

$$AOMGAV = b \times DOMGi + (1-b) \times AOMGAVo \qquad (10)$$

where, weighted average coefficients a and b are less than 1 (one).

In step 154', the routine sets OMGAVio and AOMGAVo equal to OMGAVi and AOMGAV, respectively.

In step 160', the routine sets each of OMGAVi, OMGAVio AOMGAV and AOMGAVo equal to DOMGi.

In step 190, the routine determines corrected upper and lower limits HDLV1 and HDVL2 by calculating the formulas:

$$HDLV1 = DLV1 + TREF/KDLT \qquad (11)$$

$$HDLV2 = DLV2 + TREF/KDLT \qquad (12).$$

In step 168', the routine determines whether or not DDOMGi is greater than the corrected upper limit HDLV1. In step 172', the routine determines whether or not DDOMGi is less than the corrected lower limit HDLV2.

According to the first embodiment, individual cylinder acceleration DOMGi is corrected in step 144 each time after it is calculated in step 142. Correction in step 144 is repeated each time upon increment of the counter REFCNT. According to the second embodiment, individual cylinder acceleration DOMGi is left uncorrected, but the upper and lower limits DLV1 and DLV2 are corrected in step 190. Correction in step 190 is carried once after the counter REFCNT has reached FBPD.

Thus, the second embodiment is advantageous over the first embodiment in that the number of steps required for feedback control has been reduced.

The fuel injection and ignition timing control discussed above relies on determination of acceleration based on measurement of first and second instantaneous speeds at two sampling points within a power stroke. In order to minimize errors in the measurement, the teeth 32 on the wheel 30 (see FIG. 2) have to be formed according to exact tolerances to provide accurate position references.

For a four-cylinder four-cycle engine, two cylinders reach top dead center (TDC) at the same time and the other cylinders are at bottom dead center (BDC). One engine cycle is comprised of 720 degrees of crankshaft rotation during which each cylinder passes through each of its four strokes. For example, cylinder No. 1, cylinder No. 3, cylinder No. 4 and cylinder No. 2 pass through power strokes in this order. In this case, crankshaft positions over each of power strokes of cylinders No. 1 and No. 4 are indicated by POS pulses produced by the passage of one group of teeth that are disposed along the periphery of the wheel through first 180 degrees. Crankshaft positions over each of power strokes of cylinders No. 3 and No. 2 are indicated by POS pulses produced by the passage of the other group of teeth that are disposed along the periphery of the wheel through second or the other 180 degrees. When a multi-toothed wheel manufactured according to less exact tolerances is used, there occurs a non-negligible difference in the measurements of crankshaft rotation angle between a group of cylinders No. 1 and No. 4 and a group of cylinders No. 3 and No. 2. Such a system is subject to uncontrollable errors.

To overcome this problem, there is provided a second POS sensor 200 in addition to the POS sensor 34 as shown in FIG. 2. The second sensor 200 is disposed in a fixed location closely spaced to teeth 32 for sensing when each tooth passes the sensor. These sensors 34 and 200 are spaced along the periphery of the wheel 30. They are diametrically opposed to each other such that each of the teeth 32, which is opposed to the first sensor 34, will be opposed to the second sensor 200 after crankshaft rotation through 180 degrees. Similarly to the first sensor 34, the second sensor 200 provides second POS pulses. The sensors 34 and 200 are coupled to the I/O control 60 of the control unit 50. The control unit 50 switches the correspondence between crankshaft positions and POS pulses whenever a new REF pulse is produced. Specifically, the first POS pulses are used to correspond to crankshaft positions over one interval between two REF pulses and that the second POS pulses are used to correspond to crankshaft positions over the succeeding interval between two REF pulses. As mentioned before, the reference (REF) pulses are produced at interval of rotation of the 30 through 180 degrees. This combines with the switching by the control unit 50 to correspond the first POS pulses to crankshaft positions over the first 180 degrees and the second POS pulses to crankshaft positions over the second succeeding 180 degrees. The first POS pulses over the first 180 degrees and the second POS pulses over the second succeeding 180 degrees are produced by interaction of the same group of teeth among the wheels 32 of the wheel 30 with the corresponding one of the sensors 34 and 200.

Figure 7:
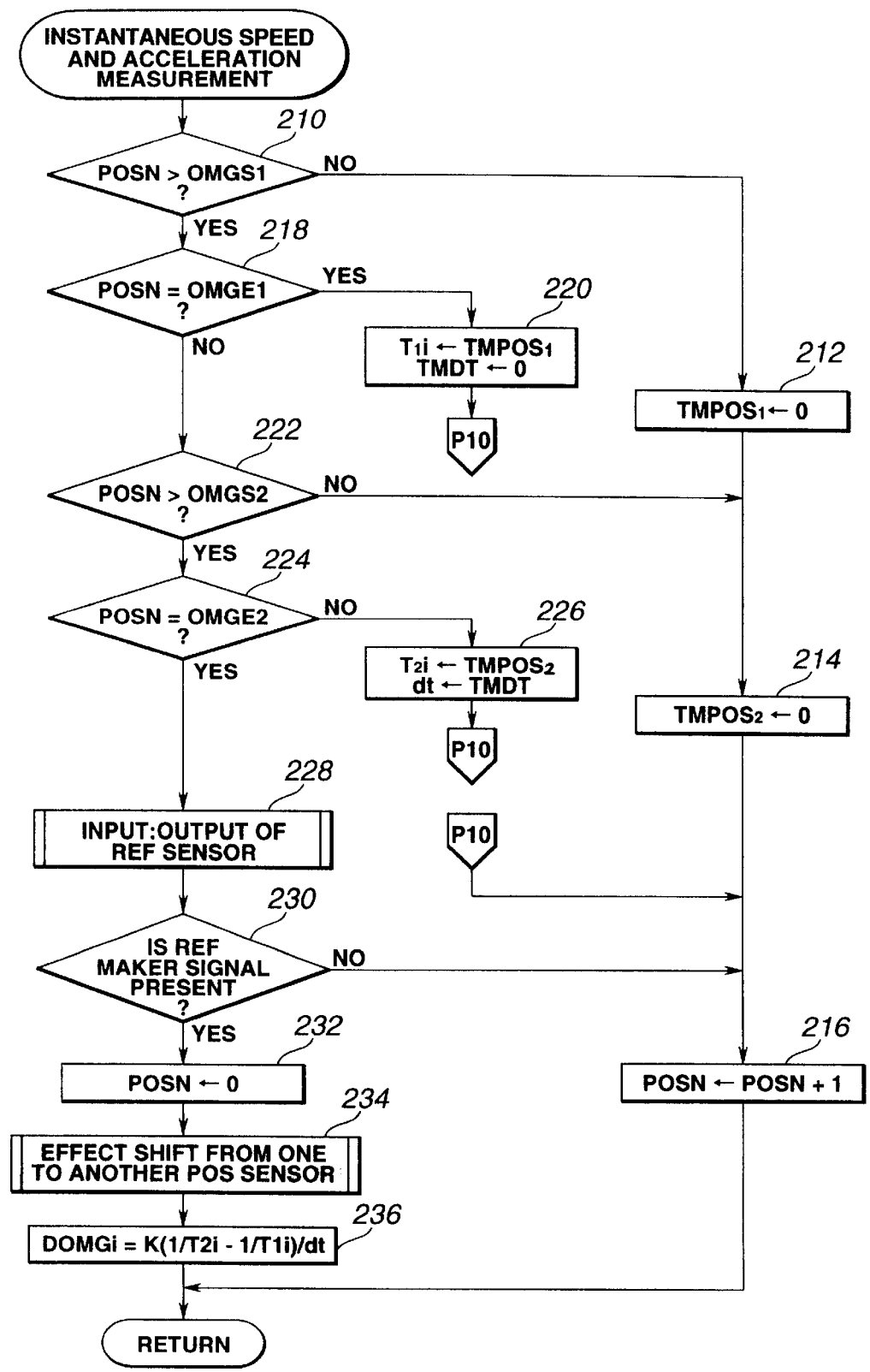
FIG. 7 is a flow chart of a routine, similar to the routine shown in FIG. 4, for instantaneous speed and acceleration measurement.

Referring to FIG. 7, another preferred implementation of the present invention is described. FIG. 7 shows a flow chart of a sub-routine for instantaneous speed and acceleration measurement. Execution of the routine is initiated by POS pulse.

In step 210 of FIG. 7, the routine determines whether or not position counter POSN is greater than OMGS1 of a first speed measurement interval. If, in step 210, the counter POSN is not greater than OMGS1, the routine resets, in step 212, first timer TMPOS1 and resets, in step 214, second timer TMPOS2. In the next step 216, the routine increments the counter POSN.

If, in step 210, the counter POSN is greater than OMGS1, that is, the crankshaft rotation angle has entered the first measurement interval, the routine determines, in step 218, whether or not the counter POSN is equal to OMGE1 of the first measurement interval. If, in step 218, the counter POSN is not equal to OMGE1, the routine determines, in step 222, whether or not the counter POSN is greater than OMGS2 of a second measurement interval. If, in step 222, the counter POSN is not greater than OMGS2, the routine resets, in step 214, the second timer TMPOS2 and then increments, in step 216, the counter POSN.

If, in step 218, the counter POSN is equal to OMGE1, the routine goes to step 220. In step 220, the routine stores the content of the first timer TMPOS1 as first interval sample T1i and resets a sampling timer TMDT.

After the crankshaft rotation has entered the second measurement interval, the routine goes from step 222 to step 224. In step 224, the routine determines whether or not the counter POSN is equal to OMGE2 of the second measurement interval. As the counter POSN is less than OMGE2 in this instance, the routine inputs, in step 228, output of the REF sensor 42. In the next step 230, the routine determines whether or not REF pulse is available. If, in step 230, no REF pulse has been issued yet, the routine goes from step 230 to 216. In step 216, the routine increments counter POSN.

Immediately after the crankshaft rotation has reached OMGE2, i.e., the end of the second measuring interval, the routine goes from step 224 to step 226. In step 226, the routine stores the content of second timer TMPOS2 as second interval sample T2i and stores the content of sampling timer TMDT as the elapsed time dt. After step 226, the routine increments the counter POSN in step 216.

Immediately after the REF pulse has been produced, the routine goes from step 230 to step 232. In step 232, the counter POSN is reset. After step 232, the routine effects a shift from the one of the POS sensors 34 and 200 to the other to use the output of the new POS sensor as the POS pulse. In the next step 236, the routine determines the ratio DOMGi by calculating the equation (1). This ratio DOMGi is used in the routine shown in FIGS. 8A, 8B, 8C and 8D.

Figure 9:
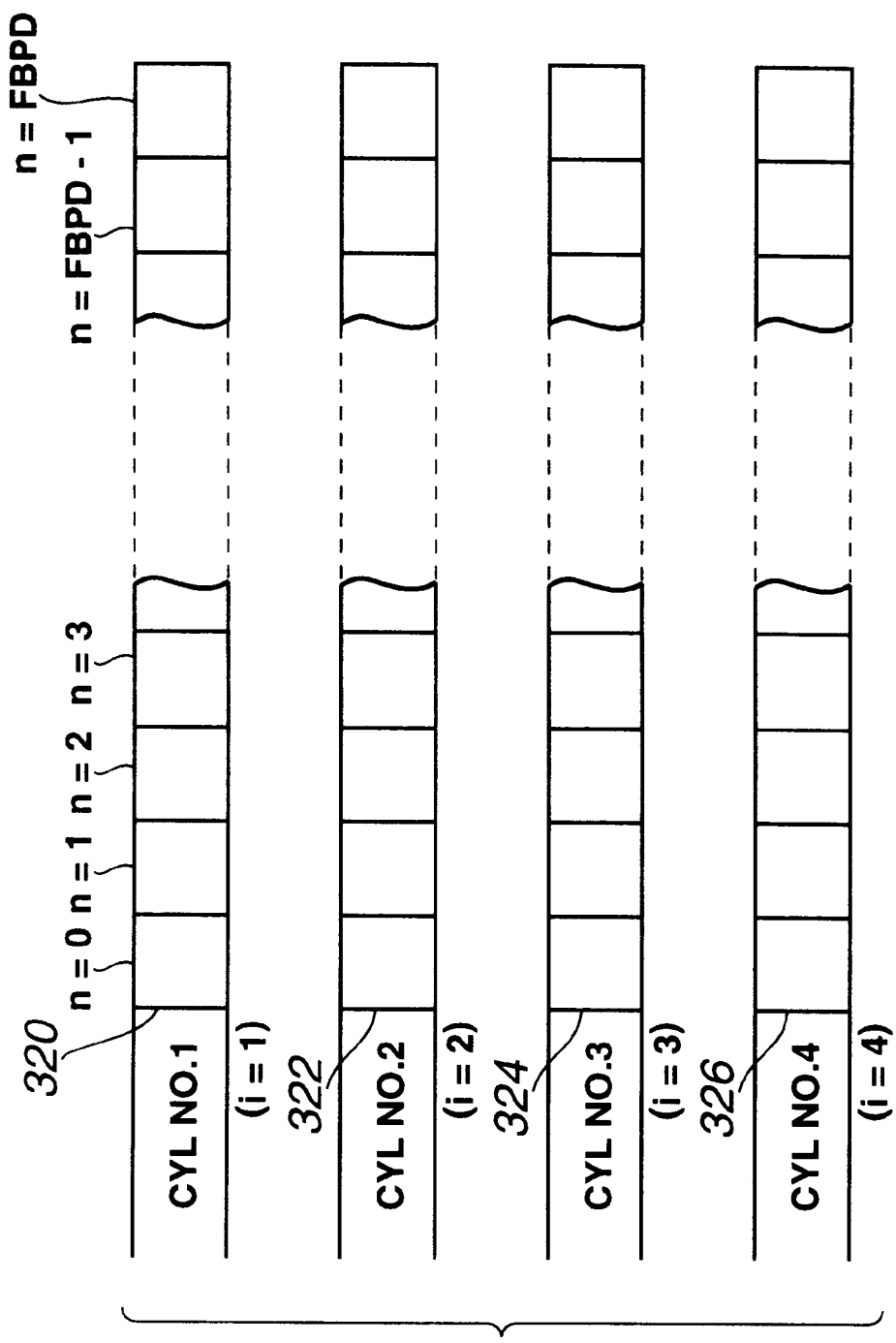
FIG. 9 is a simplified illustration of buffer memories corresponding to cylinders, respectively, for accumulating sampled data for each cylinder.

Execution of this routine is initiated by POS pulse. FIG. 9 shows buffer memories 320, 322, 324 and 326 for the cylinders No. 1, No. 2, No. 3 and No. 4, respectively. Each of the buffer memories includes sufficient number of memory locations that are labeled 0 to FBPD, respectively.

Figure 8A:
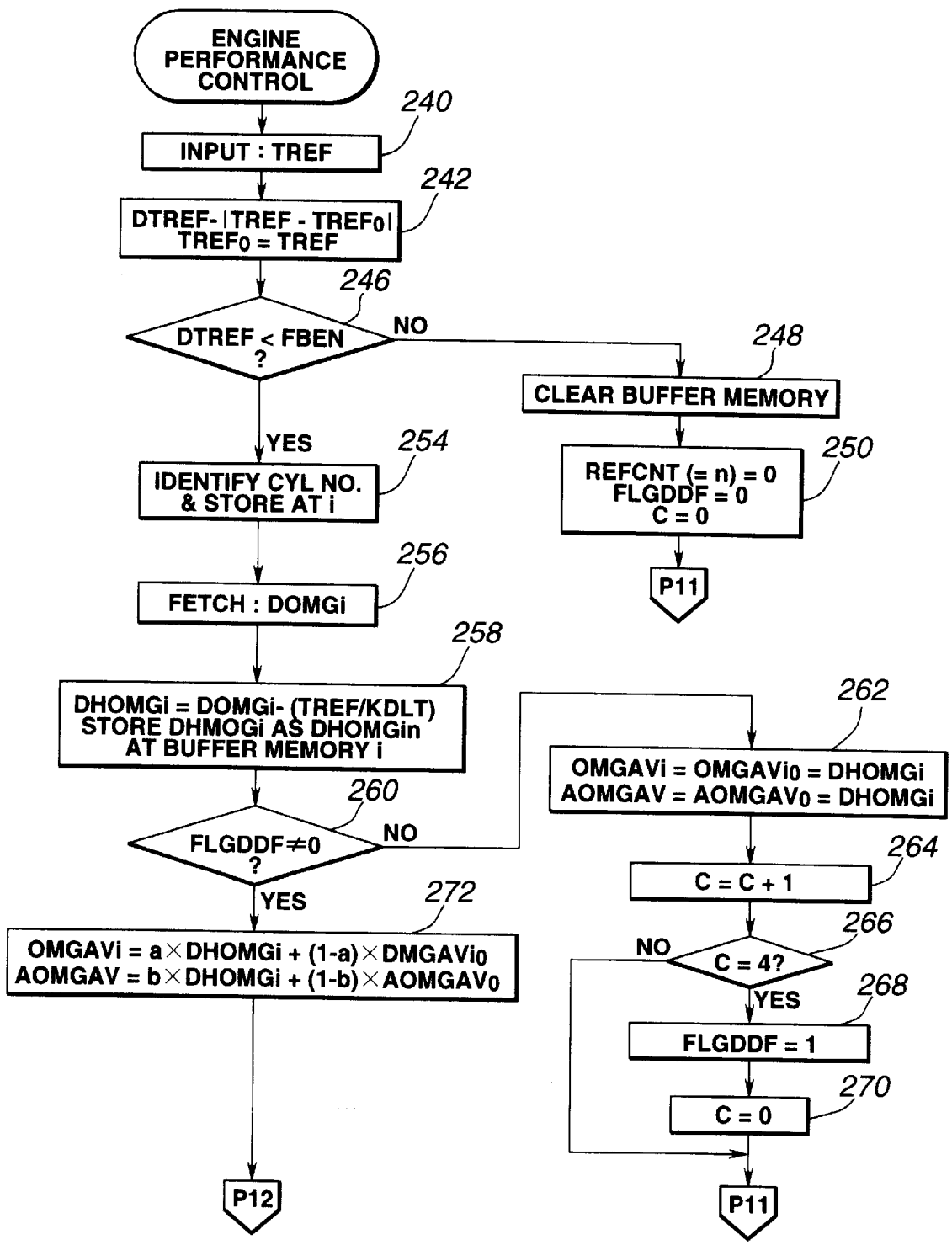
FIGS. 8A, 8B, 8C and 8D are a flow chart of a routine for engine performance control by minimizing fluctuations of cylinder power between cylinders.

In step 240 of FIG. 8A, the routine looks into the counter 52 (see FIG. 2) and inputs TREF. In the next step 242, the routine calculates an absolute value DTREF of the difference between TREF and an old value TREFo thereof, and then sets TREF as TREFo. In the next step 246, the routine determines whether or not DTREF is less than the predetermined feedback enabling value FBEN.

If, in step 246, DTREF is not less than FBEN, the routine goes to step 248 where it clears buffer memories 320, 322, 324 and 326 (see FIG. 9) and to step 250. In the step 250, the routine resets a reference counter REFCNT and an initialization flag FLGDDF as well as a cylinder counter C. If, in step 246, DTREF is less than FBEN, the routine identifies one cylinder to which the interval samples T1i and T2i correspond and stores number of this cylinder as i in step 254. In the next step 256, the routine fetches the ratio DOMGi. In step 258, the routine corrects DOMGi to give DHOMGi by calculating the equation (2) and stores DHOMGi as DHOMGin at the corresponding one buffer memory to the cylinder No. i at the memory location n (n=0, 1, 2, . . . FBEN). In the next step 260, the routine determines whether or not the initialization flag FLGDDF is not equal to 0 (zero). Assuming now that the flag FLGDDF is reset, the routine goes from step 260 to step 262. In step 262, the routine sets average of individual cylinder acceleration OMGAVi and an old value OMGAVio thereof equal to DHOMGi, respectively. In the same step 262, the routine sets average of all cylinder acceleration AOMGAV and an old value AOMGAVo thereof equal to DHOMGi, respectively. In the next step 264, the routine increments the cylinder counter C. In step 266, the routine determines whether or not the cylinder counter C is equal to 4 (four). Initialization at step 262 is repeated four times. When the cylinder counter C becomes equal to 4 (four), the routine goes from step 266 to step 268 and then to step 270. In step 268, the initialization flag FLGDDF is set equal to 1 (one). In step 270, the cylinder counter C is reset.

After the flag FLGDDF has been set equal to 1 (one), the routine goes from step 260 to step 272. In step 272, the routine determines average of individual cylinder acceleration OMGAVi and average of all cylinder acceleration AOMGAV by calculating the formulas (6) and (7).

Figure 8B:
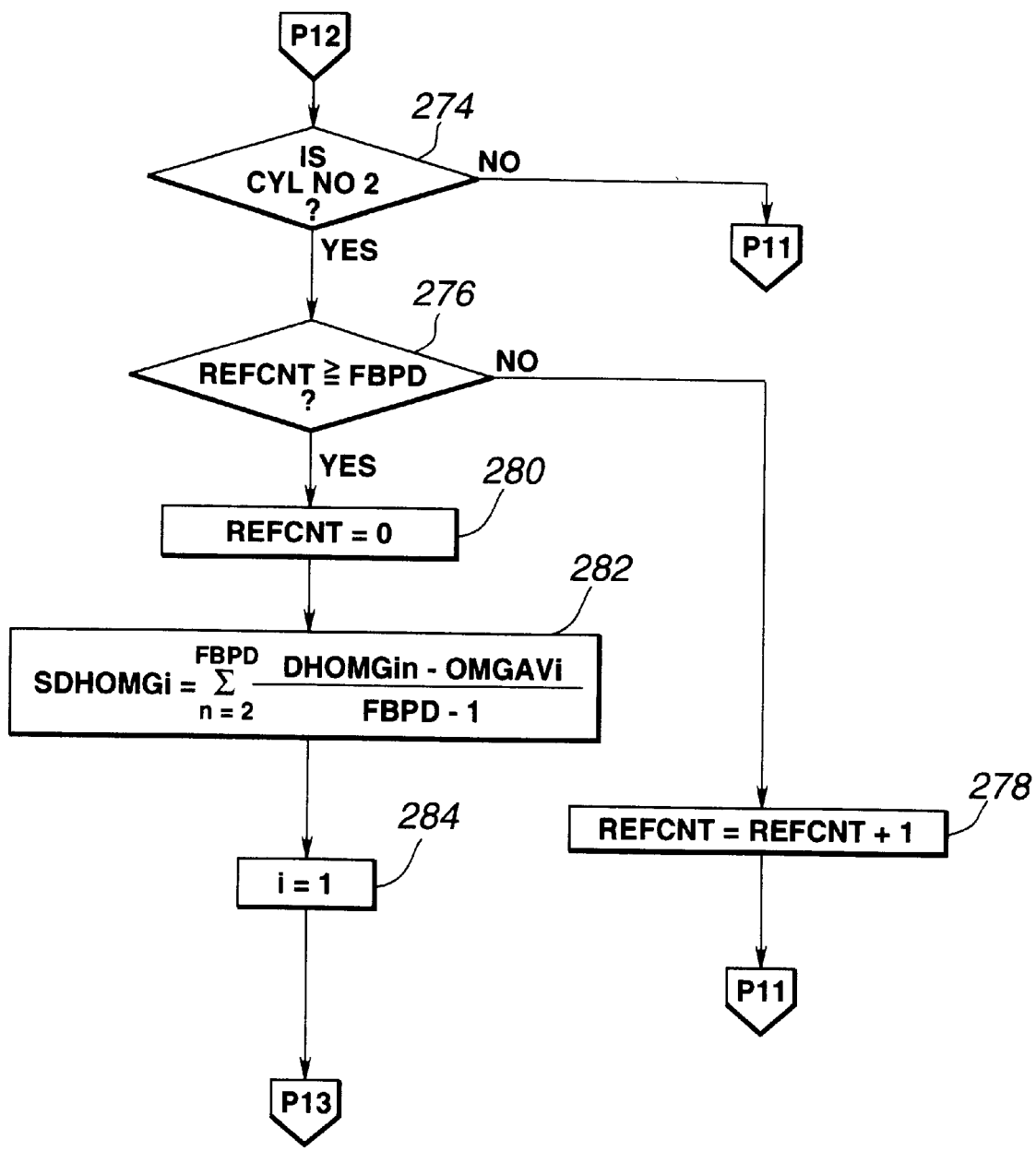
Figure 8C:
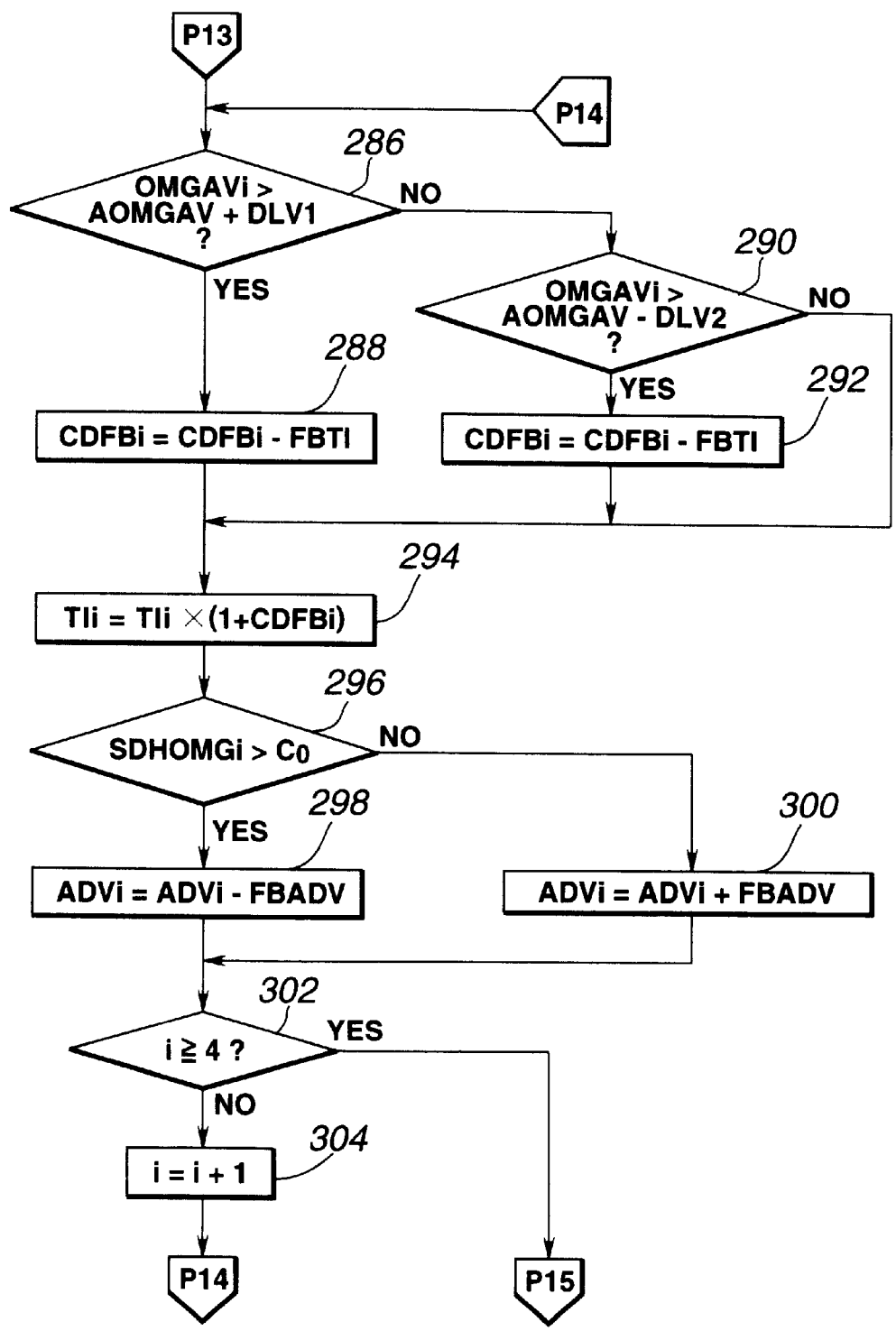

In the next step 274 of FIG. 8B, the routine determines whether or not the cylinder is cylinder No. 2. If this is not the case, the routine returns to start point. If this is the case, the routine goes from step 274 to step 276. It will be noted that one engine cycle ends with the cylinder No. 2 in this routine and four new DHOMGin are stored to the four buffer memories (see FIG. 9), respectively, during one engine cycle.

In step 276, the routine determines whether or not the reference counter REFCNT has reached FBPD. If, in step 276, REFCNT is less than FBPD, the routine increments the counter RFECNT.

It is considered that sufficient number of samples has been stored in each of the buffer memories (see FIG. 9) when the counter REFCNT has reached FBPD. In this case, the routine goes from step 276 to step 280 and then to step 282. In step 280, the counter REFCNT is reset. In the next step 282, the routine determines dispersion SDHOMGi for each of the cylinders by calculating the formula:

$$SDHOMGi = \Sigma_{n-2}(DHOMGin - OMGAVi)/(FBPD-1) \quad (13).$$

In the next step 284, the routine sets the suffix i equal to 1. In step 286 of FIG. 8C, the routine determines whether or not OMGAVi(i=1) for cylinder No. 1 is greater than (AOMGAV+DVL1). If this is the case, the routine decreases, in step 288, correction coefficient CDFBi(i=1) for cylinder No. 1 by fuel injection feedback gain FBTI. If, in step 286, OMGAVi(i=1) is not greater than (AOMGAV+DLV1), the routine goes to step 290. In step 290, the routine determines whether or not OMGAVi(i=1) is less than (AOMGAV−DLV2). If this is the case, the routine increases the correction coefficient CDFBi(i=1) by the gain FBTI. If, in step 290, OMGAVi(i=1) is not less than (AOMGAV−DLV2), the routine goes to step 294. After step 288 or 292, the routine goes to step 294.

In step 294, the routine updates fuel injection amount TIi(i=1) by multiplying TIi(i=1) with {1+CDFBi(i=1)}.

In the next step 296, the routine determines whether or not dispersion SDHOMGi(i=1) for the cylinder No. 1 is greater than a predetermined value $C_D$. If this is the case, the routine decreases, in step 298, spark advance ADVi(i=1) for cylinder No. 1 by spark advance feedback gain FBADV. If, in step 296, SDHOMGi(i=1) is not greater than $C_D$, the routine increases, in step 300, spark advance ADVi(i=1) by the gain FBADV.

After step 298 or 300, the routine determines, in step 302, whether the suffix i has reached 4. As i=1, the routine goes to step 304 where it increments the suffix i to 2 and returns to the step 286. After step 286, the routine determines TIi(i=2) and ADVi(i=2) for cylinder No. 2 until it goes to step 304.

In step 304, the routine increments the suffix i to 3 and returns to step 286. This causes the routine to determine TIi(i=3) and ADVi(i=3) for cylinder No. 3.

The routine determines TIi(i=4) and ADVi(i=4) for cylinder No. 4 after the suffix has been increased to 4 in step 304.

Figure 8D:
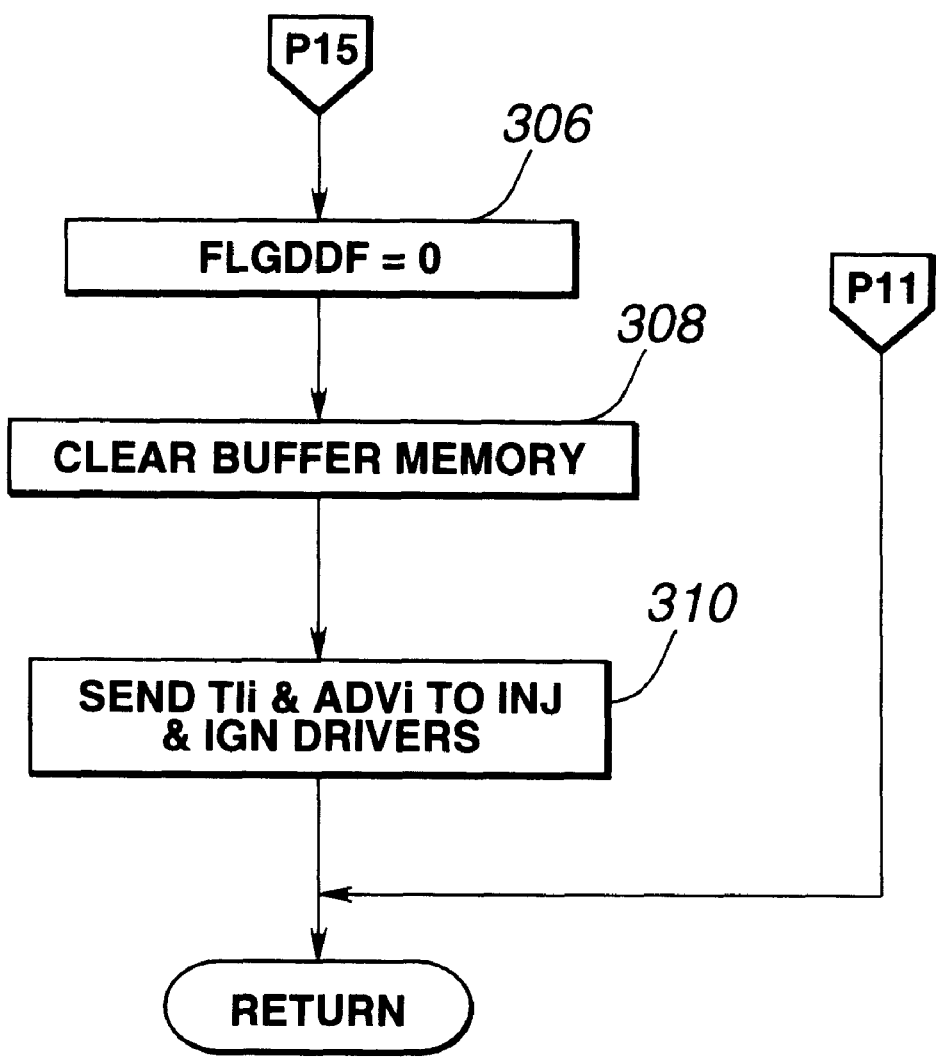

After TIi(i=1, 2, 3, 4) and ADVi(i=1, 2, 3, 4) have been set, the routine goes from step 302 to step 306 of FIG. 8D. In step 306, the initialization flag FLGDDF is reset. After step 308, the routine goes to step 308 and then to step 310. In step 308, all of the buffer memories (see FIG. 9) are cleared. In step 310, the routine sends TIi and ADVi to fuel injection and ignition drivers 72 and 62, respectively.

Figure 10A:
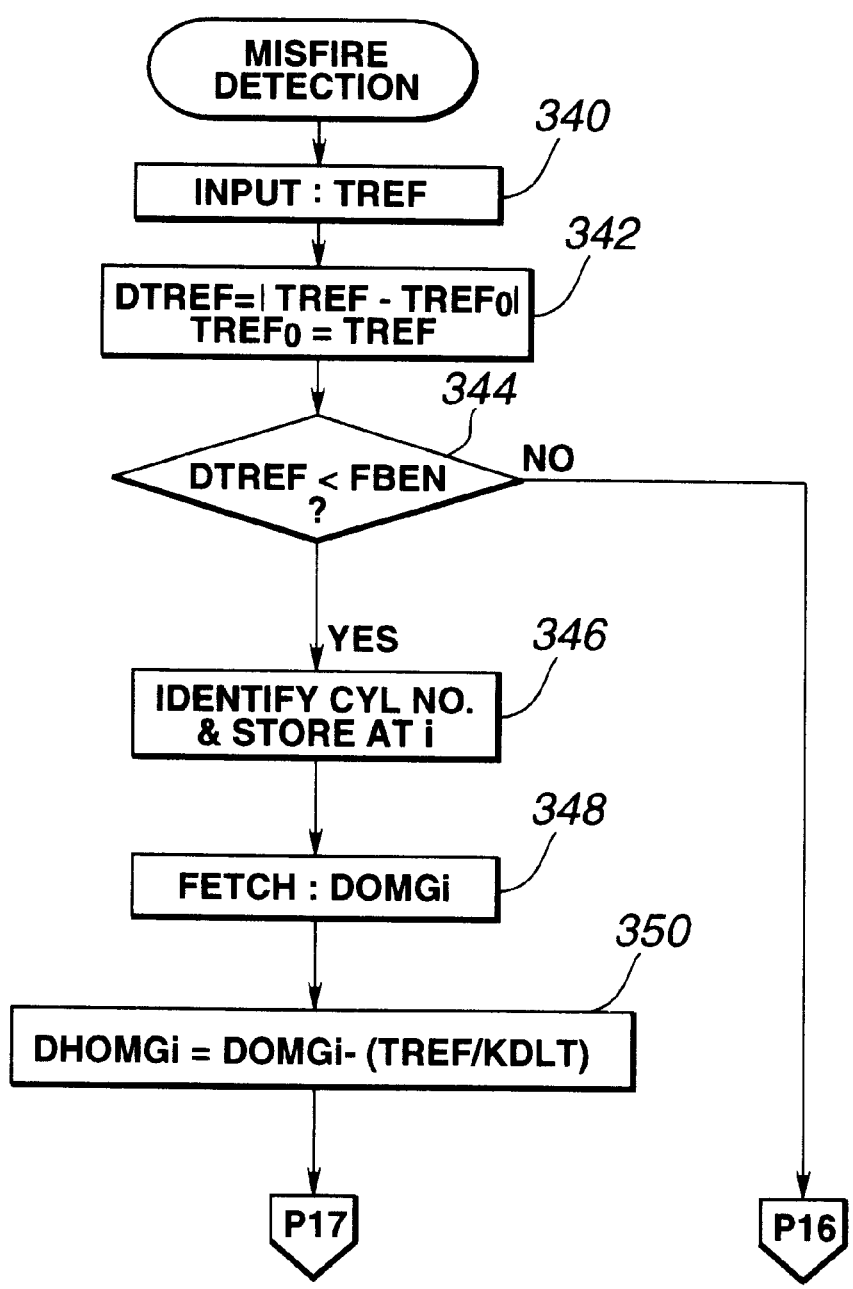
FIGS. 10A and 10B are a flow chart of a routine for misfire detection.
Figure 10B:
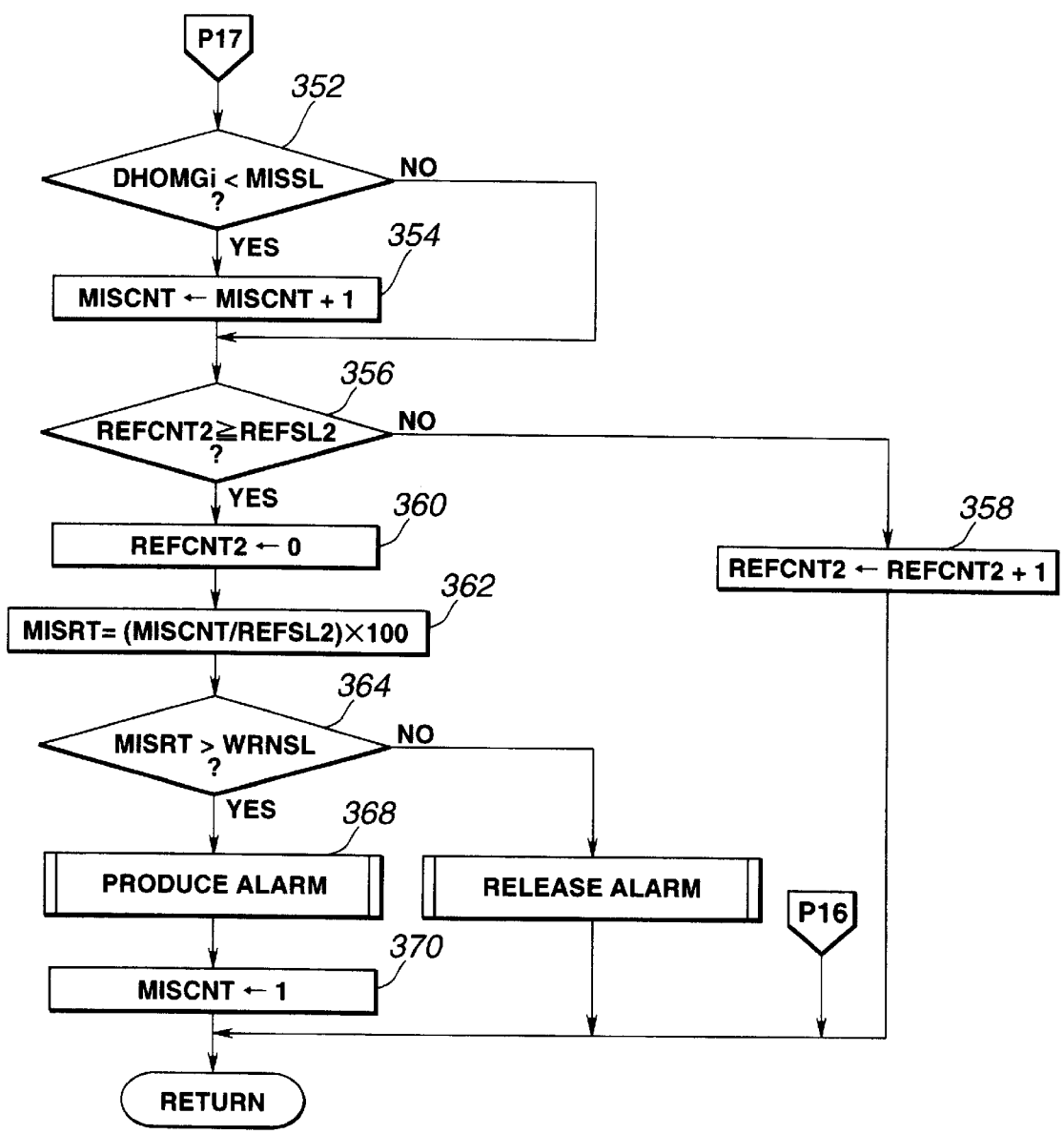

FIGS. 10A and 10B are a flowchart of a routine for misfire detection. Execution of the routine is initiated by RFE pulse.

In step 340 of FIG. 10A, the routine looks into the counter 52 (see FIG. 2) and inputs TREF. In the next step 342, the routine calculates an absolute value DTREF of difference between TREF and an old value TREFo thereof, and then sets TREF as TREFo. In the next step 344, the routine determines whether or not DTREF is less than a predetermined value FBEN.

If, in step 344, DTREF is not less than FBEN, the routine returns to start point. If, in step 344, DTREF is less than FBEN, the routine identifies one cylinder to which the interval samples T1i and T2i correspond and stores number of this cylinder as i in step 346. In the next step 348, the routine fetches the ratio DOMGi. In step 350, the routine corrects DOMGi to give DHOMGi by calculating the equation (2).

In the next step 332 of FIG. 10B, the routine determines whether or not DHOMGi is less than a predetermined misfiring level MISSL. If this is the case, the routine increments a misfiring counter MISCNT in step 354 and then goes to step 356. If, in step 352, DHOMGi is not less than MISSL, the routine goes to step 356.

In step 356, the routine determines whether or not a second reference counter REFCNT2 has reached a predetermined value REFSL2. If, in step 356, the counter REFCNT2 is less than REFSL2, the routine increments the counter REFCNT2 in step 358. If, in step 356, REFCNT2 has reached REFSL2, the routine resets the counter REFCNT2 in step 360 and determines a misfiring rate MISRT by calculating the formula:

$$MISRT = (MISCNT/REFSL2) \times 100 \quad (14).$$

In the next step 364, the routine determines whether or not MISRT is greater than a predetermined value WRNSL in step 364. If, in step 364, MISRT is not greater than WRNSL, the routine goes to step 366. In step 366, alarm is released, that is no alarm is produced. If, in step 364, MISRT is greater than WRNSL, the routine goes to step 368 and step 370. In step 368, alarm is produced to notify operator that cylinder No. i is in trouble. In the next step 370, the counter MISNT is reset to 1 (one).

What is claimed is:

1. An apparatus for measuring acceleration corresponding to power strokes of individual cylinders of an internal combustion engine, comprising:

a position sensor providing position signals at predetermined points of the rotation of the engine's crankshaft, said predetermined points being at regularly spaced rotation angles such that at least one position signal occurs during every power stroke;

a device, connected to said sensor, measuring a first time period of rotation through a first rotation interval defined by first selected position signals separated by a first angle of rotation and measuring a second time period of rotation through a second rotation interval defined by second selected position signals separated by a second angle of rotation, and measuring a third time period of rotation between said first and second rotation intervals, each of said first and second rotation intervals including a selected power stroke, said device calculating a first instantaneous speed as a function of said first measured time period and calculating a second instantaneous speed as a function of said second measured time period, said device calculating a ratio of the difference between said first and second calculated instantaneous speeds to said third measured time period, said device determining the acceleration based on said calculated ratio; and a second sensor providing reference marker signals at second predetermined points of rotation of the engine's crankshaft, said second predetermined points being at regularly spaced rotation angles such that one reference signal occurs during every power stroke.

2. An apparatus as claimed in claim 1, wherein said device measures a fourth time period of rotation through a third rotation interval defined by a selected reference marker signal immediately preceding said first and second selected position signals and the reference marker signal immediately preceding said selected reference marker signal.

3. An apparatus as claimed in claim 2, wherein said device calculates a deviation of said fourth measured time period associated with said selected power stroke from that associated with the preceding power stroke.

4. An apparatus as claimed in claim 3, wherein said device compares the absolute value of said calculated deviation with a predetermined value, wherein said device identifies a cylinder to which said selected power stroke corresponds, and wherein said device collects said calculated ratio as one of samples for said identified cylinder when the absolute value of said calculated deviation is less than said predetermined value.

5. An apparatus as claimed in claim 4, wherein said device increments a counter in response to collection of said calculated ratio as one sample, and wherein said device resets said counter when said absolute value of said deviation is not less than said predetermined value.

6. An apparatus as claimed in claim 2, wherein said device determines a correction factor by dividing said fourth measured time period by a selected normalized constant, and wherein said device determines an instantaneous acceleration by subtracting said determined correction factor from said calculated ratio.

7. An apparatus as claimed in claim 6, wherein said device calculates a deviation of said fourth measured time period associated with said selected power stroke from that associated with the preceding power stroke, wherein said device compares the absolute value of said calculated deviation with a predetermined value, wherein said device identifies a cylinder to which said selected power stroke corresponds, and wherein said device collects said determined instantaneous acceleration as one of samples for said identified cylinder when the absolute value of said calculated deviation is less than said predetermined value.

8. An apparatus as claimed in claim 7, wherein said device calculates the average of a predetermined number of collected samples; and wherein said device sets said calculated average as the acceleration corresponding to said identified cylinder.

9. An apparatus for measuring acceleration corresponding to power strokes of individual cylinders of an internal combustion engine, comprising:

a position sensor providing position signals at predetermined points of the rotation of the engine's crankshaft, said predetermined points being at regularly spaced rotation angles such that at least one position signal occurs during every power stroke; and a device, connected to said sensor, measuring a first time period of rotation through a first rotation interval defined by first selected position signals separated by a first angle of rotation and measuring a second time period of rotation through a second rotation interval defined by second selected position signals separated by a second angle of rotation, and measuring a third time period of rotation between said first and second rotation intervals, each of said first and second rotation intervals including a selected power stroke, said device calculating a first instantaneous speed as a function of said first measured time period and calculating a second instantaneous speed as a function of said second measured time period, said device calculating a ratio of the difference between said first and second calculated instantaneous speeds to said third measured time period, said device determining the acceleration based on said calculated ratio, wherein said first rotation interval occurs near the beginning of each power stroke and said second rotation interval occurs halfway between the beginning of one power stroke and the beginning of the successive power stroke.

10. An apparatus for measuring acceleration corresponding to power strokes of individual cylinders of an internal combustion engine, comprising:

a position sensor providing position signals at predetermined points of the rotation of the engine's crankshaft, said predetermined points being at regularly spaced rotation angles such that at least one position signal occurs during every power stroke, wherein said position sensor comprises a rotor for rotation with the crankshaft having reference marks at predetermined positions, and a plurality of stationary pickups, each sensing the passage of said reference marks; and a device, connected to said sensor, measuring a first time period of rotation through a first rotation interval defined by first selected position signals separated by a first angle of rotation and measuring a second time period of rotation through a second rotation interval defined by second selected position signals separated by a second angle of rotation, and measuring a third time period of rotation between said first and second rotation intervals, each of said first and second rotation intervals including a selected power stroke, said device calculating a first instantaneous speed as a function of said first measured time period and calculating a second instantaneous speed as a function of said second measured time period, said device calculating a ratio of the difference between said first and second calculated instantaneous speeds to said third measured time period, said device determining the acceleration based on said calculated ratio.

11. An apparatus as claimed in claim 10, wherein said plurality of stationary pickups are arranged along the periphery of said rotor at regularly spaced rotation angles such that a portion of said reference marks passes one of said plurality of stationary pickups during every power stroke.

12. An apparatus as claimed in claim 11, further comprising:

a second sensor providing reference marker signals at second predetermined points of rotation of the engine's crankshaft, said second predetermined points being at regularly spaced rotation angles such that one reference signal occurs during every power stroke.

13. An apparatus as claimed in claim 12, wherein said device selectively renders said plurality of pickups operable in response to occurrence of one reference marker signal to provide the position signals.

14. An apparatus for controlling combustion of individual cylinders of an internal combustion engine, comprising:

a sensor providing position signals at predetermined points of rotation of the engine's crankshaft, said predetermined points being at regularly spaced rotation angles such that at least one position signal occurs during every power stroke; and a device, connected to said sensor, measuring a first time period of rotation through a first rotation interval defined by first selected position signals separated by a first angle of rotation and measuring a second time period of rotation through a second rotation interval defined by second selected position signals separated by a second angle of rotation, and measuring a third time period of rotation between said first and second rotation intervals as the crankshaft is being driven through at least one engine cycle, each of said first and second rotation intervals including a selected power stroke, wherein one engine cycle includes a plurality of power strokes corresponding in number with the number of cylinders of the engine, said device calculating for each power stroke a first instantaneous speed as a function of said first measured time period and a second instantaneous speed as a function of said second measured time period, said device calculating for each power stroke a ratio of the difference between said first and second calculated instantaneous speeds to said third measured period, said device collecting said calculated ratio as one of samples for one cylinder to which said selected power stroke corresponds, said device calculating for each cylinder the individual cylinder average based on the collected samples, said device calculating for all the cylinders the all cylinder average based on the collected samples, said device establishing a window about the all cylinder calculated average, said window being defined by first and second values, said device comparing for each cylinder the individual cylinder average with said window, said device modifying at least one control parameter for combustion of one cylinder when the individual cylinder average for the one cylinder falls outside said window.

15. An apparatus as claimed in claim 14, wherein said calculated ratio is modified with a correction factor variable with instantaneous speed of the crankshaft.

16. An apparatus as claimed in claim 14, wherein said calculated ratio is modified with a correction factor proportional to a reciprocal of instantaneous speed of the crankshaft.

17. An apparatus as claimed in claim 14, wherein said calculated ratio is decreased by a correction factor before being collected as one sample, said correction factor resulting from dividing a reciprocal of instantaneous speed of the crankshaft by a normalized constant.

18. An apparatus as claimed in claim 14, wherein said first and second values defining said window are modified by a correction factor variable with instantaneous speed of the crankshaft.

19. An apparatus as claimed in claim 14, wherein said first and second values defining said window are modified with a correction factor proportional to a reciprocal of instantaneous speed of the crankshaft.

20. An apparatus as claimed in claim 14, wherein said first and second values defining said window are decreased by a correction factor, said correction factor resulting from dividing a reciprocal of instantaneous speed of the crankshaft by a normalized constant.

21. An apparatus for controlling combustion of individual cylinders of an internal combustion engine, comprising:

a sensor providing position signals at predetermined points of rotation of the engine's crankshaft, said predetermined points being at regularly spaced rotation angles such that at least one position signal occurs during every power stroke; and a device, connected to said sensor, measuring a first time period of rotation through a first rotation interval defined by first selected position signals separated by a first angle of rotation and measuring a second time period of rotation through a second rotation interval defined by second selected position signals separated by a second angle of rotation, and measuring a third time period of rotation between said first and second rotation intervals as the crankshaft is being driven through at least one engine cycle, each of said first and second rotation intervals including a selected power stroke, wherein one engine cycle includes a plurality of power strokes corresponding in number with the number of cylinders of the engine, said device calculating for each power stroke a first instantaneous speed as a function of said first measured time period and a second instantaneous speed as a function of said second measured time period, said device calculating for each power stroke a ratio of the difference between said first and second calculated instantaneous speeds to said third measured period, said device collecting said calculated ratio as one of samples for one cylinder to which said selected power stroke corresponds, said device calculating for each cylinder the individual cylinder average based on the collected samples, said device calculating for each cylinder the dispersion of the collected samples with respect to the calculated individual cylinder average, said device comparing for each cylinder the calculated dispersion with a predetermined value, said device modifying at least one control parameter for combustion of each cylinder in response to the result of said comparison.

22. An apparatus for performing a power performance test to determine power faults of individual cylinders of an internal combustion engine, comprising:

a sensor providing position signals at predetermined points of rotation of the engine's crankshaft, said predetermined points being at regularly spaced rotation angles such that at least one position signal occurs during every power stroke; and a device, connected to said sensor, measuring a first time period of rotation through a first rotation interval defined by first selected position signals separated by a first angle of rotation and measuring a second time period of rotation through a second rotation interval defined by second selected position signals separated by a second angle of rotation, and measuring a third time period of rotation between said first and second rotation intervals as the crankshaft is being driven through at least one engine cycle, each of said first and second rotation intervals including a selected power stroke, wherein one engine cycle includes a plurality of power strokes corresponding in number with the number of cylinders of the engine, said device calculating for each power stroke a first instantaneous speed as a function of said first measured time period and a second instantaneous speed as a function of said second measured time period, said device calculating for each power stroke a ratio of the difference between said first and second calculated instantaneous speeds to said third measured period, said device determining for each power stroke an instantaneous acceleration based on said calculated ratio, said device comparing for each power stroke said determined instantaneous acceleration with a predetermined value to give a result for storage for one cylinder to which said determined instantaneous acceleration corresponds, said device collecting said stored result of said comparison as one of a predetermined number of samples for each cylinder, said device calculating for each cylinder the power fault rate based on the predetermined number of collected samples, said device comparing for each cylinder the power fault rate with a second predetermined value and providing power fault indication when the power fault rate is greater than said second predetermined value.

23. A method of measuring acceleration corresponding to power strokes of individual cylinders of an internal combustion engine, comprising the steps of:

providing position signals at predetermined points of the rotation of the engine's crankshaft, said predetermined points being at regularly spaced rotation angles such that at least one position signal occurs during every power stroke;

measuring a first time period of rotation through a first rotation interval defined by first selected position signals separated by a first angle of rotation;

measuring a second time period of rotation through a second rotation interval defined by second selected position signals separated by a second angle of rotation;

measuring a third time period of rotation between said first and second rotation intervals, each of said first and second rotation intervals including a selected power stroke, calculating a first instantaneous speed as a function of said first measured time period;

calculating a second instantaneous speed as a function of said second measured time period, calculating a ratio of the difference between said first and second calculated instantaneous speeds to said third measured time period;

determining the acceleration based on said calculated ratio;

providing reference marker signals at second predetermined points of rotation of the engine's crankshaft, said second predetermined points being at regularly spaced rotation angles such that one reference signal occurs during every power stroke;

measuring a fourth time period of rotation through a third rotation interval defined by a selected reference marker signal immediately preceding said first and second selected position signals and the reference marker signal immediately preceding said selected reference marker signal;

determining a correction factor by dividing said fourth measured time period by a selected normalized constant; and determining an instantaneous acceleration by subtracting said determined correction factor from said calculated ratio.

24. A method of measuring acceleration corresponding to power strokes of individual cylinders of an internal combustion engine, comprising the steps of:

providing position signals at predetermined points of the rotation of the engine's crankshaft, said predetermined points being at regularly spaced rotation angles such that at least one position signal occurs during every power stroke;

measuring a first time period of rotation through a first rotation interval defined by first selected position signals separated by a first angle of rotation;

measuring a second time period of rotation through a second rotation interval defined by second selected position signals separated by a second angle of rotation;

measuring a third time period of rotation between said first and second rotation intervals, each of said first and second rotation intervals including a selected power stroke, calculating a first instantaneous speed as a function of said first measured time period;

calculating a second instantaneous speed as a function of said second measured time period, calculating a ratio of the difference between said first and second calculated instantaneous speeds to said third measured time period;

determining the acceleration based on said calculated ratio;

measuring a fourth time period of rotation through a third rotation interval defined by a selected reference marker signal immediately preceding said first and second selected position signals and the reference marker signal immediately preceding said selected reference marker signal;

calculating a deviation of said fourth measured time period associated with said selected power stroke from that associated with the preceding power stroke;

comparing the absolute value of said calculated deviation with a predetermined value;

identifying a cylinder to which said selected power stroke corresponds; and collecting said calculated ratio as one of samples for said identified cylinder when the absolute value of said calculated deviation is less than said predetermined value.

25. A system as claimed in claim 24, further comprising incrementing a counter in response to collection of said calculated ratio as one sample; and resetting said counter when said absolute value of said deviation is not less than said predetermined value.

* * * * *